Dec. 15, 1970  D. C. YOUNG  3,547,984
OXIDATION OF OLEFINS WITH A CARBOLLYL
COMPLEX OF A GROUP VIII METAL
Filed May 3, 1968  2 Sheets-Sheet 2

○ – BORON ATOM
● – CARBON ATOM
◉ – BORON OR CARBON ATOM
○ – X, Y, R OR R'
  X, Y, R OR R'

INVENTOR.
DONALD C. YOUNG
BY
*Robert E. Strauss*
ATTORNEY

United States Patent Office 3,547,984
Patented Dec. 15, 1970

3,547,984
OXIDATION OF OLEFINS WITH A CARBOLLYL COMPLEX OF A GROUP VIII METAL
Donald C. Young, Fullerton, Calif., assignor to Union Oil Company of California, Los Angeles, Calif., a corporation of California
Filed May 3, 1968, Ser. No. 726,437
Int. Cl. C07c 67/04
U.S. Cl. 260—497          11 Claims

ABSTRACT OF THE DISCLOSURE

The invention comprises the use of carbollyl complexes of Group VIII metals as catalysts for oxidation of ethylenically unsaturated compounds to more valuable chemicals including carbonyls such as carboxylic acids, aldehydes, ketones as well as carboxylate esters of unsaturated alcohols, ketals, acetals and unsaturated ethers. The carbollyl ligand is highly electrophilic and imparts high oxidation states to the Group VIII metals and stabilizes the higher oxidation states of transition metals, thereby activating these metals for catalysis of oxidative reactions. Homogeneous or heterogeneous catalysis in liquid or vapor phase is contemplated in the invention.

DESCRIPTION OF THE INVENTION

The invention comprises contacting an ethylenically unsaturated reactant with a complex of a Group VIII metal and a carbollide.

The carbollide is a carbon and boron containing ligand having the shape of an icosahedron with one missing apex. Its empirical formula is:

$$[(BX)_{6-n}(BR)_n(BR'')_{5-(m+o)}(CR')_m(BY)_o]^b$$

wherein:

X is hydride or halide;
R is alkyl, aryl, alkenyl or haloalkyl;
R' is hydride, halide, organosilianonyl, alkyl, aryl, alkenyl, carboxyl, carboxyethyl, cycloalkyl or ammonium;
R'' is hydride, halide, aryl, alkenyl, alkyl or cycloalkyl;
Y is a ligand and is an unsaturated alicyclic or aliphatic hydrocarbon having from 2 to about 15 carbons or a compound having at least one atom that is halogen, oxygen, nitrogen, sulfur or trivalent phosphorus, bismuth, arsenic or antimony;
$o$ is 0 or 1;
$n$ is 0, 1 or 2;
$m$ is 1 or 2; and
$b$ is the valence of the carbollide and is from −1 to −3.

The complexes of the carbollide and metal generally have the following empirical formula:

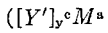
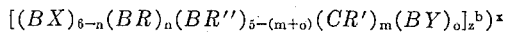

wherein:

M is a transition metal with valence, $a$;
Y and Y' are ligands having from 2 to about 15 carbons and are unsaturated alicyclic or aliphatic hydrocarbon or a compound having at least one atom that is halogen, oxygen, nitrogen, sulfur or trivalent phosphorus, bismuth, arsenic or antimony;
R', R'', $o$, $m$ and $n$ are as aforementioned;
$y$ is 1 or 3; $z$ is 1 or 2;
$c$=net valence of ligand;
$b$=valence of carbollyl group; and
$x=a+c+b$ Exceptions to the preceding generalized empirical formula of the complex are the complex dimers which exist for the complexes of the iron group metals, i.e., iron, cobalt and nickel carbonyl carbollyl complexes. An empirical formula for the simplest dimer of a metal dicarbollyl metal complex is:

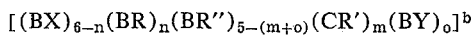

wherein M and M' are group VIII metals such as iron or cobalt or nickel.

The term "carbollide" as used herein refers to carbon and boron anions having a characteristic shape of a truncated icosahedron, possessing the ability to form complexes with metal atoms and corresponding to the following empirical formulae:

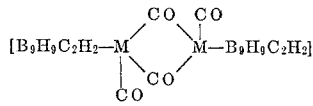

$[(BX)_{7-n}(BR)_n(BR'')_2(CR')_2]^b$
Dicarbaundecahydroundecaborate (dicarbollide) ion $[(BX)_{6-n}(BR)_n(BR'')_2(CR')_2BY]^b$
B-ligand-dicarbaundecahydroundecaborate
(B-ligand-dicarbollite) ion $[(BX)_{8-n}(BR)_n(BR'')_2CR']^b$
monocarbaundecahydroundecaborate
(monocarbollide) ion $[(BX)_{7-n}(BR)_n(BR'')_2CR'BY]^b$
B-ligand-monocarbaundecahydroundecaborate
(B-ligand-monocarbollide) ion All the preceding are isoelectronic, containing a total of 72 electrons with the net valence, $x$, dependent on the identity of the X, Y or R groups.

The carbollides have the structure of a regular icosahedron with one vertex missing. The boron and carbon atoms lie in the vertices of the truncated icosahedron and this structure is reflected in the characteristic naming of the anions; the prefix "clovo" indicating a cage structure and the term "carbollide" being derived from "olla," the Spanish word for jug which is resembled by the structure of the truncated icosahedral anion.

The carbollides are analogous to cyclopentadienide ion and form π-complexes with metal atoms in a manner similar to cyclopentadienide ion. The carbollyl metal complexes, however, have greater stability than cyclopentadienyl metal complexes and the carbollyl group also stabilizes the higher oxidation states of the metal. The catalytically active materials useful in this invention are the sandwich bis-π-carbollyl metal complexes as well as mono-π-carbollyl metal complexes with one or more additional ligands. As used herein, the term carbollyl metal complex will be generic to the bis- and mono-π-carbollyl metal complexes.

Oxidations which can be catalyzed by the catalyst of this invention include the oxidation of olefinic and acetylenic hydrocarbons to aldehydes, ketones and carboxylic acids; the oxidation of olefins to esters of unsaturated alcohols, acetals, ketals and unsaturated ethers. Specific adaptations of the catalysts of my invention to these reactions will be set forth in succeeding paragraphs after the following detailed and illustrated description of the catalysts.

The figures illustrate the carbollides and their metal complexes as follows:
  FIG. 1 illustrates the preparation of various carbollides;
  FIG. 2 illustrates the orbitals of the carbollides available for metal complex formation;
  FIG. 3 illustrates a B-ligand substituted carbollide;
  FIG. 4 illustrates a bis-π-carbollyl metal complex;
  FIG. 5 illustrates a π-cyclopentadienyl-π-carbollyl metal complex;

Figure 1:
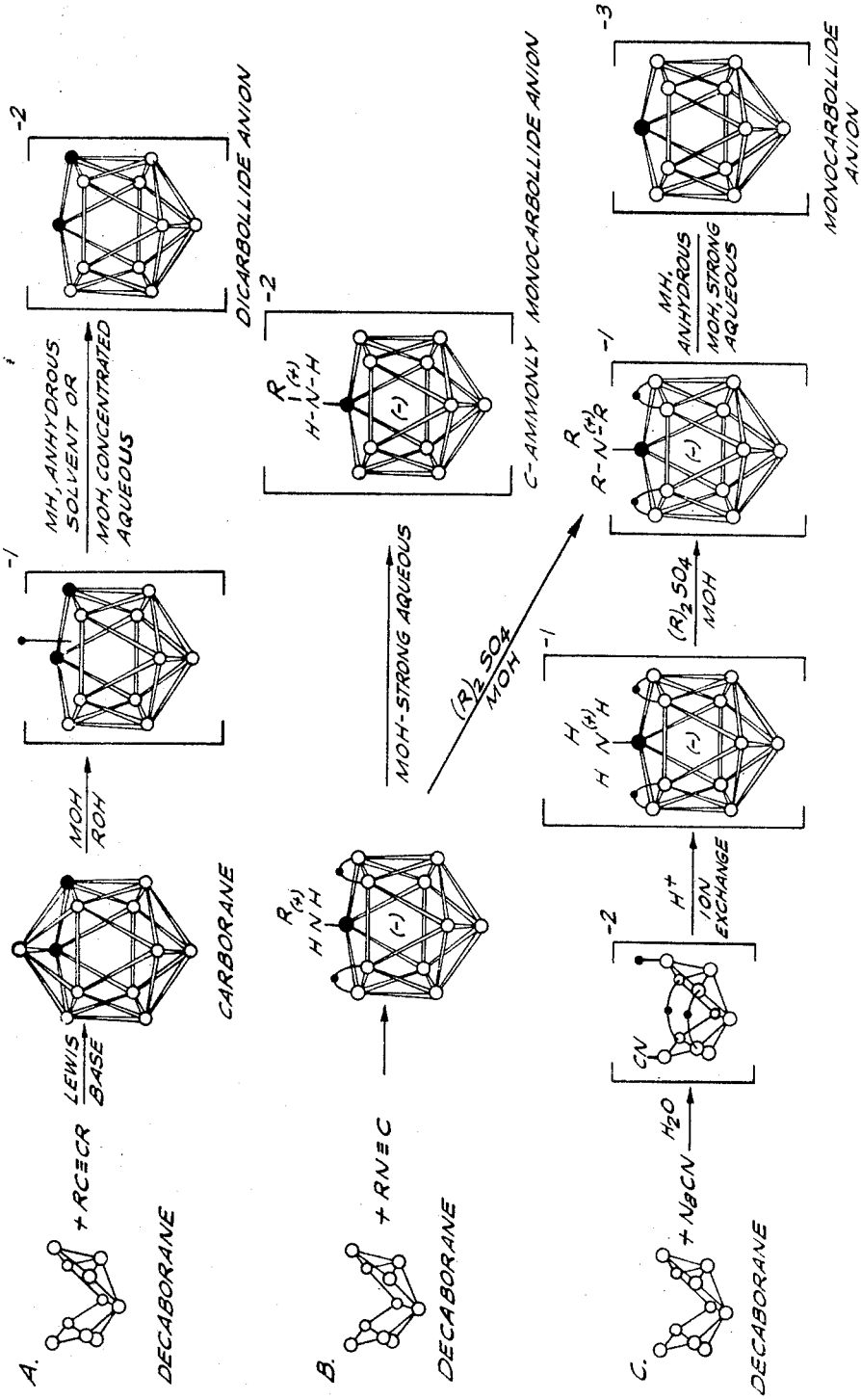

Referring now to FIG. 1, three methods for preparation of carbollide anions are shown. In this diagram, the boron atoms are unshaded and the carbon atoms are shaded. The small shaded spheres represent significant hydrogen atoms while the terminal substituents X, Y, R, R', or R'', one of which is attached to each boron or carbon atom, have been omitted from this drawing where these substituents do not significantly affect the preparation of the anions.

The carbollides are prepared from decaborane or alkyl substituted decaborane by either of three preparations which are described in greater detail hereinafter and which are illustrated in the examples.

In preparation A, decaborane is reacted with an acetylene to produce carborane which is degraded with alcoholic base to abstract a boron atom. Treatment of the resultant material with an alkali metal hydride in an anhydrous solvent or treatment with concentrated aqueous base removes the protonic hydrogen which is associated with the open face of the intermediate and thereby forms the dicarbollide anion.

In preparation B, decaborane is reacted with an alkyl or aryl isolcyanide which forms a carborane having the structure of a truncated icosahedron with an ammonium group on the carbon atom and bridging hydrogen atoms on the two pairs of face boron atoms. Treatment of this compound with strong aqueous base removes the two bridging hydrogens and yields a C-ammonyl monocarbollide anion.

Preparation C reacts an alkali metal cyanide with decaborane to form a divalent cyanoborane anion. This material is passed over an acidic ion exchange solid to close the structure and form a carborate anion which is a homolog of the intermediate of preparation B. This material is then N-alkylated by treatment with a dialkyl sulfate in an alkali metal hydroxide solution. The intermediate of preparation C can similarly be N-alkylated. The fully N-alkylated material can then be treated with an alkali metal hydride in anhydrous solution or with concentrated aqueous alkali metal hydroxide to abstract the trialkyl ammonium group and the two bridging hydrogens from the face of the truncated icosahedron thereby forming a monocarbollide ion. The monocarbollide and dicarbollide anions prepared in methods A, B and C are isoelectronic.

Figure 2:
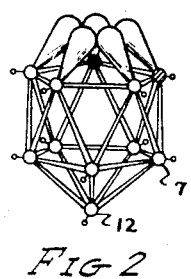

FIG. 2 illustrates the vacant $sp^3$ orbital lobes on the open face of the truncated icosahedron structure of the carbollide anion. Each atom in the anion has a terminal substituent such as X, Y, R, R' or R'' previously mentioned. The ion is described as the (3)-1,2-dicarbollide anion (ortho isomer) wherein the number in parenthesis refers to the missing boron atom and the 1,2 numbers indicate the positions of the carbon atoms in the icosahedral cage. The corresponding monocarbollide is identified as (3)-1-monocarbollide anion. Isomers of the dicarbollide structure are possible and can be prepared in the manner hereinafter described wherein the carbon atoms occupy other positions in the cage, i.e., the (3)-1,7-dicarbollide (neo isomer) and the (3)-1,12-dicarbollide (para isomer) anion.

Figure 3:
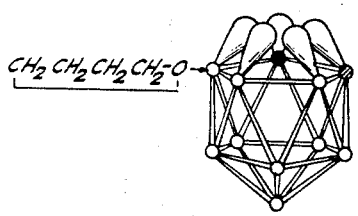

FIG. 3 illustrates the B-ligand-carbollide structure wherein a ligand such as tetrahydrofuran is substituted on a boron atom. This ligand can be substituted on either of the three boron atoms in the face of the truncated icosahedron and symmetrical and asymmetrical isomers are thereby provided. Two ligand isomers occur with the (3)-1,2-dicarbollide ion. These are *symmetric* 8-ligand-(3)-1,2-dicarbollide and *asymmetric* 4-ligand-(3)-1,2-dicarbollide. Bith ligand substituted monocarbollide isomers are asymmetric.

Figure 4:
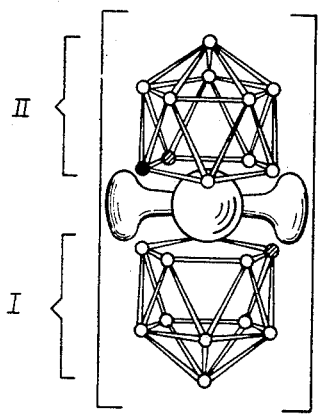

The Group VIII metals are capable of forming π-molecular orbitals with the five S.P.³ orbital lobes shown on the open face of the truncated icosahedron of FIGS. 2 and 3 and these metals will therefore readily complex with the carbollide ions. The metals form a set of three bonding molecular orbitals containing a total of six electrons all of which are provided by the metal atom. When these complexes are formed in the absence of any other ligand, bis-π-complexes are formed as are illustrated in FIG. 4 wherein two of the carbollyl truncated icosahedrons are complexed with a single metal atom designated as M. The net valency of this complex is indicated as $a+b+c$ wherein $b$ is the previously mentioned valence for the carbollide designated as I and $c$ is the valence for carbollide II and $a$ is the formal oxidation state of the metal. This value can be from −6 to +2 depending on the value of $a$, $b$ and $c$. The more readily prepared complexes have net valences from −5 to 0, i.e., are neutral or anionic; however, cations can be achieved with strong oxiding treaments which promote high oxidation states of the metal atom.

In FIG. 4, the metal atom is shown surrounded with a $h_{ag}$ molecular orbital. The calculation of this orbital is similar to the Moffitt molecular orbital treatment of ferrocene. This orbital is available for interaction or coordination with reactants, e.g., olefins, etc., as the first step in the catalyzed reaction.

Figure 5:
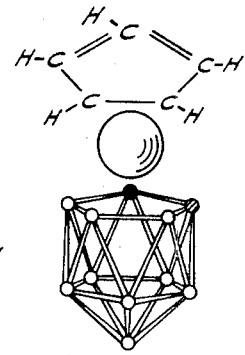
Figure 6:
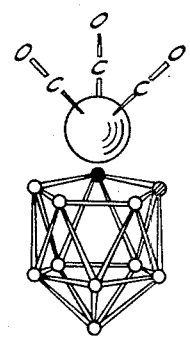
FIG. 6 illustrates a π-tricarbonyl-π-carbollyl metal complex.
Figure 7:
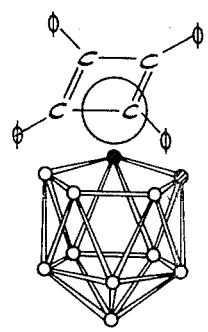
FIG. 7 illustrates a π-tetraphenyl-cyclobutadienyl-π-carbollyl metal complex.

The complex can also be formed in the presence of other ligands, i.e., reactants capable of contributing a total of six electrons to form bonding orbitals with a metal atom. FIGS. 5, 6 and 7 illustrate the structure of the catalyst of my invention for the cyclopentadienyl, tricarbonyl and tetraphenyl cyclobutadienyl derivatives respectively, of the carbollyl metal complex.

CARBOLLIDE PREPARATION
DICARBOLLIDE PREPARATION

The dicarbollides used in this invention to prepare dicarbollyl metal complexes are derived from dicarborane $(B_{10}H_{10}C_2H_2)$ which in turn is derived from decaborane (14). The preparation is illustrated in FIG. 1, method A. In the preparation of dicarborane, decaborane is purified by sublimation or recrystallization and dissolved in an organic solvent such as en ether. A Lewis base such as diethylsulfide, acetonitrile, etc., is added to this solution and the solution is maintained at about 25°–85° C. for an extended period while acetylene is passed into contact with the solution. The reaction is as follows:

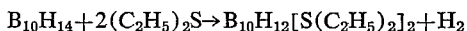
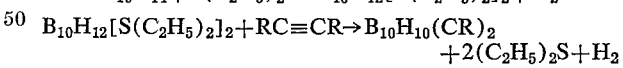

The reaction mixture is evaporated under vacuum to remove the Lewis base, e.g., diethylsulfide, and the solvent. The product is dissolved in an inert solvent and reacted with concentrated hydrochloric acid to convert byproducts to hydrogen and borates. The crude dicarborane is recovered from the solvent by cooling and separating it as a solid. The solid product is washed with aqueous potassium hydroxide, filtered and dried. The dried solid is then extracted with a hydrocarbon solvent and purified dicarborane is crystallized as a solid from the hydrocarbon.

The product from the acetylene addition is 1,2-dicarbaclovododecaborane. Heating of this product neat or in an inert solvent to a temperature of about 500° C. will isomerize the 1,2-dicarborane to the 1,7-dicarborane isomer in substantially total yield. Heating of the 1,7-isomer to about 600° C. will cause further rearrangement to the 1,12-dicarborane.

The dicarborane can be obtained with various substituents on the carbon atoms by the use of appropriately substituted acetylene. Thus bromomethyl dicarborane can be obtained by the use of propargyl bromide rather than acetylene in the aforedescribed preparation. Use of phenyl aceytlene likewise provides phenyl dicarborane. In general, any substituted acetylene can be used in the preparation of the dicraboranes and thereby obtain a dicarborane having the same substituent on its carbon atom or atoms. Examples of suitable acetylenic reactants include amyl acetylene, amylmethyl acetylene, butyl acetylene, butylethyl acetylene, butylmethyl acetylene, chloro acetylene, decylmethyl acetylene, di-n-amyl acetylene, dibromo acetylene, dibutyl acetylene, diiodo acetylene, diethyl acetylene, dimethyl acetylene, diphenyl acetylene, dipropyl acetylene, divinyl acetylene, ethyl acetylene, ethylpropyl acetylene, n-heptyl acetylene, isopropyl acetylene, methylphenyl acetylene, n-propyl acetylene, vinyl acetylene, etc. These carbon substituted dicarboranes can be thermally isomerized to the 1,7- and 1,12-dicarboranes in the same fashion described in regard to the unsubstituted dicarborane.

The dicarbollide ion can be prepared in two steps from the 1,2- or the 1,7-dicarborane which can have hydrogen or any of the aforementioned substituents on the cage carbon atoms. In the first step a monovalent dicarbadodecahydroundecaborate anion is obtained by degradation of dacarborane with alcoholic base, e.g., alcoholic solution of potassium hydroxide, sodium hydroxide or piperidine. This is illustrated in FIG. 1 as the second step in method A. In this preparation, the dicarborane is dissolved in a suitable alcohol, e.g., methanol, ethanol, isopropanol, butanol, etc., which contains a strong alkali such as an alkali metal hydroxide or piperidine. The reaction is performed at ambient to reflux temperatures at atmospheric or superatmospheric pressure. The strong base abstracts a boron atom from the carborane which forms a borate ester with the alcohol and evolves hydrogen from the reaction mixture, as follows, with potassium hydroxide in methanol:

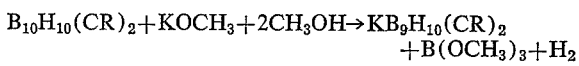

After hydrogen ceases to be evolved, the reaction mixture is cooled and the alkali metal dicarbadodecahydroundecaborate can be purified by precipitation of the excess alkali as the carbonate by saturating the solution with carbon dioxide, filtration, and evaporating the filtrate to dryness to recover the alkali dicarbadodecahydroundecaborate. The resultant salt can be converted to the salt of other cations by base exchange reactions to thereby obtain the ammonium salts or organic ammonium salts.

The monovalent dicarbadodecahydroundecaborate ion can be converted to the divalent dicarbollide anion by treatment to abstract a protonic hydrogen which is associated with the face of the truncated icosahedral dicarbadodecahydroundecarborate ion. This treatment is illustrated in the last step of method A, FIG. 1. The treatment to abstract this protonic hydrogen involves treatment of the dicarbadodecahydroundecaborate ion with an alkali metal hydride or concentrated alkali metal hydroxide. The reaction can be performed in an inert solvent, e.g., tetrahydrofuran, or can be performed with concentrated (at least about 50 weight percent) aqueous alkali metal hydroxide. When the reaction is performed in the inert solvent, the divalent dicarbollide ion or salt thereof can be obtained. The reaction in an aqueous base, however, is performed in the presence of a complex of a transition metal, hereinafter described, and the product is the carbollyl metal complex.

The preparation in an inert solvent is herein described; however, both preparations are illustrated in the examples. Sodium hydride can conveniently be used as a 50 percent dispersion in tetrahydrofuran. The alkali metal salt of the dicarbadodecahydroundecaborate ion is added to the dispersion and the temperature is raised to reflux temperature at which point hydrogen is evolved. The resultant dicarbollide anion precipitates as the alkali metal dicarbollide and can be recovered from the solvent by filtration. The precipitate can be purified by extraction with a hydrocarbon to obtain a residue comprising the purified alkali metal dicarbollide.

The alkali metal salt can be obtained as the salt of other cations by base exchange reactions in non-protonic solvents with such cations, e.g., ammonium chloride, tetramethyl ammonium chloride, other alkali metal salts such as cesium or rubidium chloride, etc. This dicarbollide anion is employed to form dicarbollyl metal complexes which serve as catalysts in my invention.

MONOCARBOLLIDE PREPARATION

The monocarbollide anion used in this invention to prepare carbollyl metal complexes is prepared from an alkylammonium carborane having the general formula $B_{10}H_{12}CNR'_2R$ wherein $R'$ is hydrogen or alkyl and R is alkyl such as methyl, ethyl, propyl and butyl, etc. The alkylammonium carborane is prepared from decaborane according to either method B or method C illustrated in FIG. 1. In method B, decaborate is reacted with an isocyanide of the aforementioned alkyl groups. The reaction is as follows:

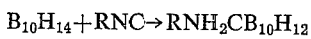

This reaction is performed at ambient temperature and results in the insertion of a carbon atom in the boron structure to yield a truncated icosahedron unit with a carbon atom in the open face having an alkylammonium group dependent thereon and hydrogen atoms bridging the two pairs of boron atoms in the open face of the icosahedron.

The alkylammonium carborane is converted to the monocarbollide anion in the second step of method B by treatment with concentrated (at least about 50 weight percent) aqueous alkali metal hydroxide. This treatment can also be performed in the presence of a complex of a transition metal to prepare directly the carbollyl metal complex. The treatment with the strong base results in abstraction of the bridge hydrogens on the face boron atoms and converts the ammonium carborane into a divalent C-ammonly monocarbollide anion which can complex with transition metals. This complex can be used as the catalyst in my invention or, if desired, the carbon atom can be substituted with various groups by using the Grignard reaction hereinafter described. At least one of the boron atoms on the icosahedron base can also be substituted with a ligand by carrying out the oxidative substitution reaction also hereinafter described.

The monocarbollide anion can be obtained with a hydrogen rather than an ammonium group on the face carbon. This is achieved by fully N-alkylating the ammonium carborane with an alkyl sulfate in a strong base. This treatment is shown on FIG. 1 by the arrow that extends to the fully N-alkylated ammonium carborane shown in method C. Treatment of this material with an alkali metal hydride in anhydrous solvent, e.g., tetrahydrofuran, or with concentrated (at least 50 weight percent) aqueous alkali metal hydroxide abstracts the bridging hydrogen atoms and also abstracts the ammonium group, thereby forming the trivalent monocarbollide anion.

An alternate preparation of the N-alkylated ammonly carborane is shown in method C. In this method, an alkali metal cyanide is reacted with decaborane in aqueous solution as follows:

The cyanoborane is passed over an ion exchange solid which causes rearrangement of the anion to the neutral C-ammonly carborane. This material can then be fully N-alkylated by treatment with an alkyl sulfate to provide the last intermediate to the trivalent monocarbollide anion.

CARBON SUBSTITUTED CARBOLLIDE PREPARATION

As previously mentioned, the carbollides can be obtained wherein various substituents are bonded to the boron and the carbon atoms of the carbollyl cage. These derivatives are attached to the cage atoms by two center bonds. For the simplest case the groups on the cage atoms are terminally bonded hydrogen. The carbon atoms, however, can be substituted with a plurality of hydrocarbon groups having from 1 to about 12 carbons such as alkyl, e.g., methyl, propyl, isopropyl, ethyl, butyl, amyl, dodecyl, etc.; aryl, e.g., phenyl, tolyl, xylyl, naphthyl, cumenyl, ethylphenyl, etc.; alkenyl, e.g., propenyl, amyl, butenyl, octenyl, dodecenyl, etc.; halo, e.g., iodo, bromo, chloro, fluoro; carboxyl, hydroxyl as well as the $C_1$–$C_5$ alkyl derivatives thereof such as hydroxyalkyl, e.g., hydroxyethyl, hydroxypropyl, hydroxyamyl, etc.; alkoxy, e.g., ethoxy, isopropoxy, butoxy, etc.; alkylcarbonyl, e.g., methylcarbonyl, ethylcarbonyl, isopropylcarbonyl, amylcarbonyl, etc.; alkoxycarbonyl, e.g., methoxycarbonyl, ethoxycarbonyl, isopropoxycarbonyl, etc.; carboxyalkyl, carboxypropenyl, etc.; haloalkyls, e.g., chloroethyl, fluoropropyl, bromoamyl, iodomethyl, etc.

The aforementioned substituents can be formed on one or both of the carbons of the dicarborane used as the dicarbollyl precursor by use of the appropriately substituted acetylene in the synthesis of the dicarborane from decaborane as previously mentioned. The use of some substituted acetylenes and the identification of the resultant 1 and 1,2-substituted carboranes appears in Inorganic Chemistry, vol. 2, No. 6, pp. 1115–1119. The syntheses comprise reaction of the substituted acetylene with decaborane in an inert solvent and in the presence of a Lewis base such as acetonitrile or diethylsulfide. Using the appropriately substituted acetylene, the synthesis of the following carboranes is reported: 1-ethyl carborane, 1-propylcarborane, 1-hexylcarborane, vinylcarborane, 1-phenylcarborane, 1-beta-chloroethylcarborane, 1 - Ω - chloropropylcarborane, 1 - chloromethylcarborane, 1-beta-bromoethylcarborane, 1-carboranylmethyl acetate, 1-caranylmethyl acrylate, 1-carboranylglycol diacetate, 1-carboranylethylidene dipropionate, 1-methyl-2-carboranylethylidene dipropionate, 1,2-bis(alpha-methylvinyl)carborane, 1,2-bis(chloromethyl)carborane, 1,2-bis(carbomethoxy) carborane, 1-methyl-2-bromomethylcarborane, 1,2-diisopropylcarborane, 1,2-bis(hydroxymethyl)-carborane, 1-hydroxymethyl-2-(γ-hydroxy-α-propyl) - carborane, diethyl-2,2-bis-(1-carboramylmethyl)-malonate and 1-bromomethyl-2-methylcarborane. Any of the preceding or following identified carboranes can be used in the preparation of the carbollide ligands as previously described to obtain corresponding C-substituted carbollyl metal complexes which can be used as catalysts for the oxidations according to this invention.

CARBON SUBSTITUTED DERIVATIVES

The hydrogen bonded to the carbon of the mono- or di-carborane or of the mono- or di-carbollide cage exhibits the similar reactivity as the hydrogen on acetylene and accordingly a cage carbon atom can also be substituted by any of the reactions employed for substitution on acetylene. Thus, the carborane can be alkylated by reaction with an alkyl halide in the presence of a Lewis acid such as aluminum or ferric bromide or chloride; see U.S. Pat. 2,999,117; to substitute the cage carbon atoms with an alkyl or aryl group.

The cage carbons can also be substituted with a variety of groups by the Grignard reaction. In this reaction, the 1- or 1,2-halo substituted carbonane or carbollide is reacted in an inert solvent, e.g., ethyl ether, with magnesium to form a Grignard reagent which readily undergoes stadard Grignard reactions to substitute the cage carbons. This reaction is described in the aforecited publication and in Inorganic Chemistry, vol. 2, No. 6, pp. 1115–1125 (December 1963). The carboranyl Grignard reagent, e.g., 1-carboranylmethylmagnesium bromide can be reacted with: (1) alkyl or alkenyl ketones or aldehydes to prepare secondary and tertiary carboranyl alcohols; (2) formaldehyde to prepare a primary carboranyl alcohol; or (3) alkyl, aryl or alkenyl halides to prepare alkyl, aryl or alkenyl substiuted carboranes; (4) acetals to prepare alkyl carboranyl ethers; or (5) nitriles to prepare carbonyl ketones.

Examples of reactants which can be used are: formaldehyde, acetaldehyde, propionaldehyde, butyraldehyde, isobutyraldehyde, methylethyl ketone, diisopropyl ketone, benzaldehyde, crotonaldehyde, acrolein, etc.; ethyl chloride, methyl bromide, allyl bromide, chlorobenzene, amyl fluoride, chloronaphthalate, etc.; 1,1-dimethoxy ethane, 1,1-diisopropoxy butane, 1,1-diethoxy hexane, etc.; acetonitrile, acrylonitrile, benzonitrile, crotonitrile, valeronitrile, methacrylonitrile, butyronitrile, isobutyronitrile, capronitrile, etc. The choice of solvent can also influence the product obtained from the Gignard reaction, e.g., has been reported that when allyl bromide was reacted with the Grignard reagent, 1-carboranylmethylmagnesium bromide, the normal reaction yields 4-(1-carboranyl)-1-butene; however, with tetrahydrofuran as the solvent, 1-allyl-2-methylcarborane is obtained.

The carborane can also be reacted with alkyl and aryl-lithium reagents, e.g., butyl or phenyl lithium, at temperatures from 0° to 30° C. to providethe 1-lithium and 1,2-dilithium carboranes which can then be reacted to produce carboranyl acids, carbinols and halides. To illustrate, the contacting of dilithium dicarborane with carbon dioxide at temperatures from 0° to 25° C. forms the lithium salt of 1,2-carboranedicarboxylic acid from which the acid can be formed by acidificaion. Contacting the lithium carborane with an alkylene oxide, e.g., ethylene oxide, yields the hydroxyalkyl derivative, e.g., 1,2-bis-(hydroxyethyl)-carborane. The carboranediformyl halides can be obtained by reaction of the lithium salt of 1,2-carboranedicarboxylic acid with excess oxalyl chloride. The resultant acid chloride can then be reacted with alkyl, cycloalkyl and alkenyl alcohols to form esters of the 1,2-carboranedicarboxylic acid. The disubstituted carboranes have also been found to exhibit a strong tendency to form 1,2-exocyclic derivatives. Treatment of the bis (hydroxy)-carboranes with an acid such as concentrated sulfuric at temperatures from 100° to 175° C. forms cyclic ethers. Upon heating to about 250°–300° C. the bis(2-carboxy-1-carboranylmethyl)ether form 2 moles of a carboranyl lactone, $B_{10}H_{10}CCH_2OC(O)C$; and the 1,2-dicarboranedicarboxylic acid form a cyclic anhydride by contacting with dehydrating agents such as thionyl chloride in the presence of sodium carbonate.

BORON SUBSTITUTED DERIVATIVES

The preceding discussion has been directed to the use of decaborane as the initial reactant. The decaborane can be substituted with hydrocarbon groups on the four borons in the basal plane. Use of the substituted decaborane thereby provides a carborane or (3)-carbododecahydroundecaborane with hydrocarbon substituents on the 5, 6, 9 and 10 boron atoms. Examples of suitable hydrocarbon groups containing from 1 to about 12 carbons that can be substituted on the decaborane are alkyl, e.g., methyl ethyl, isopropyl, amyl, decyl, dodecyl, octadecyl, hexadecyl, aryl, e.g., phenyl, tolyl, xylyl, cumenyl, benzyl, phenylethyl, α-naphthyl, 6-methyl-α-naphthyl, p-amylphenyl, etc.

The hydrogen atoms bonded to the boron of the icosahedral cage is also bonded with a two-center bond and these hydrogen atoms can be replaced with various substituents. Simple halogenation of the carborane or carbollide anions will first halogenate the moron atoms to provide carbollides containing up to 10 bromo, fluoro, chloro, or iodo atoms. A description of the halogenation as applied to chlorination of dicarborane appears in Inorganic Chemistry, vol. 2, No. 6, pages 1092–1096 (December 1963). A similar halogenation technique can be applied to the monocarborane to produce its halogenated derivatives. This reaction comprises contacting the carborane in an inert solvent with gaseous halogen, e.g., chlorine. The boron atoms are halogenated first before halogenation of the carbon atom or atoms. The degree of halogenation can be controlled by limiting halogen concentration or the solvent, e.g., carbon tetrachloride, to precipitate the halogenated carboranes as the di, tri, tetra, hexa, octa, deca and undeca-halocarborane.

The carbollide can also be obtained having one or two of the cage boron atoms in the upper plane, i.e., atoms 4, 8 and 7 of the dicarbollide or atoms 4, 8, 7 and 2 of the monocarbollide substituted with an alkyl, aryl or alkenyl group having from 1 to about 12 carbons and the halo, carboxy or sulfo derivatives thereof. A procedure that can be used to prepare the boron substituted derivatives comprises reforming the carborane from the carbollide anion using an organic boron halide. The resultant boron substituted carborane can then be treated with strong base or alkali metal halide to abstract a boron atom from the cage and form a boron substituted carbollide. This procedure can be repeated to prepare a di-substituted carbollide having two of the open face borons substituted with an organic group. This procedure is illustrated in the examples and briefly comprises reaction of a soluble salt, e.g., alkali metal salt of the carbollide anion with an organic substituted boron halide. This reaction is performed at ambient conditions of temperature and pressure and proceeds as follows:

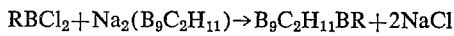

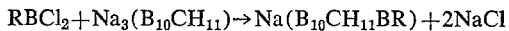

wherein R contains from 1 to about 12 carbons and is alkyl, alkenyl, aryl and halo, carboxy or sulfo derivatives thereof. Examples of suitable R groups are methyl, carboxymethyl, chloromethyl, ethyl, isopropyl, amyl, dodecyl, octadecyl, phenyl, p-bromophenyl, 2-lauryl-4-sulfophenyl, xylyl, tolyl, naphthyl, dichlorophenyl, vinyl, allyl, butenyl, etc. The resultant boron substituted carborane can then be reacted in the manner previously described to abstract a boron hydride from the icosahedron structure and thereby form a B-substituted carbadodecahydroundecaborate ion with the organic substituent on a boron atom in the open face of the truncated icosahedron. Repeated insertion of a like or differently substituted boron atom provides a route to B,B'-disubstituted carbollide ions.

As previously mentioned, one of the boron atoms in the face of the truncated icosahedron carbollide ion can also be substituted with a suitable ligand. Any of the aforementioned ligands can be employed for this substitution which is an oxidative substitution performed by reacting a salt of the carbollide ion or the carbadodecahydroundecaborate ion with an oxidizing agent such as ferric chloride, cupric chloride, etc., in the presence of the ligand. This treatment results in oxidation of a hydrogen of a boron atom in the face of the truncated icosahedral cage with reduction of the ferric or cupric chloride to ferrous or cuprous chloride and substitution of the ligand on a boron atom. The reaction illustrated with potassium carbadodecahydroundecaborates is as follows:

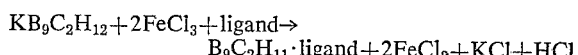

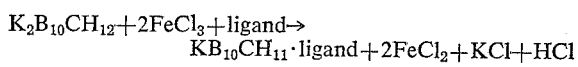

The substitution occurs on the boron atoms in the face of the truncated icosahedral carbollide ion. Two isomers are formed from the dicarba homolog and these isomers are symmetrical or asymmetrical depending on the location of the substituted boron atom on the face of the truncated icosahedron. Both isomers of the monocarba homolog are asymmetric. This substitution can be performed with any of the ligands mentioned in the section hereinafter entitled "Ligands." The following is a listing of some of the carbollide ions which can be formed in this manner: 8-tetrahydrafuran-(3) - 1,2 - dicarbollide; 4-tetrahydrafuran - 1,2 - dimethyl - 1,2 - dicarbollide; 8-pyridine(3) - 1,2 - dicarbollide; 8-tetrahydrafuran-(3)-1-monocarbollide; 4-pyridine(3) - 1 - methyl - 1 - monocarbollide; 7-diethylsulfide-(3) - 1,2 - dimethyl - 1,2-dicarbollide; 4-triphenylphosphine-(3) - 1,2 - dicarbollide; 4-methylcyanide-(3)-1-phenyl, 1,2-dicarbollide; etc.

The substituents on any of the face atoms of the truncated icosahedral anion can significantly affect the activity of the dicarbollyl metal complex for catalysis. This effect results from the projection of these face atom substituents into the $h_{ag}$ orbital, i.e., the dumbell-shaped electron cloud about the metal atom which is illustrated in FIG. 3. Illustrative of the effect of face atom substituents on the properties of a dicarbollyl metal complex is the following listing of the oxidation potentials of the carbon substituted bis-$\pi$-(1)-2,3 -dicarbollyl metal complexes.

| Complex: | Oxidation potential |
|---|---|
| $(CH_3)_4N[(BH)_9(CH)_2]Fe$ | +0.42 |
| $Cs[(BH)_9(CH)_2]_2Fe$ | +0.42 |
| $(CH_3)_4[(BH)_9(CCH_3)_2]_2Fe$ | +0.54 |
| $(CH_3)_4N[(BH)_9CHCC_6H_5]_2Fe$ | +0.46 |
| $(CH_3)_4N[(BH)_9(CH)_2]Co$ | +1.4 |
| $(CH_3)_4N[(BH)_9CHCC_6H_5]_2Co$ | +1.3 |
| $(CH_3)_4N[(BH)_9C(CH_3)_2]_2Co$ | +1.2 |

The substituents on the cage atoms also can be varied to control the solubility and compatibility of the carbollyl metal complex in liquid reaction media. The neutral species is soluble in non-polar organic solvents and some organic polar solvents including aliphatic and aromatic alcohols, ethers and ketones. The alkali metal or ammonium salts of the anionic carbollyl metal complexes are soluble in polar solvents such as water, aliphatic and aromatic alcohols, ethers and ketones, aliphatic and aromatic amides, sulfoxides, sulfones, carboxylic acids, esters, etc. By variation of the cage carbon or boron substituents the solubility of either the neutral or anionic species can be controlled as desired. To illustrate, water solubility can be imparted by substitution of a carboxy, alkoxy, sulfoaryl, etc. group on a carbollyl carbon atom while solubility in non-polar solvents can be controlled by substitution of the carbon or boron cage atoms with a long chain or fatty alkyl group such as dodecyl, octadecyl, etc. In liquid phase processing, recovery of the catalyst from the reaction zone or crude reaction product can be aided by the proper choice of these substituents. To illustrate, most oxidations tend to accumulate high boiling byproducts in the reaction solvent which are not recoverable from the catalyst by simple distillation. To maintain activity, a slight portion of the reaction medium (from 0.01 to 5 percent of the medium) can be continuously or intermittently withdrawn and discarded from the reaction. The catalyst can be recovered from this withdrawn portion prior to its discard by simple water washing when at least one of the cage carbon atoms bears a hydrophilic group such as carboxy, carboxymethyl, sulfophenyl, hydroxyethyl, etc.

LIGANDS

Ligands as defined herein for substitution on a boron atom of the carbollide ion by use in the oxidative substitution reaction previously mentioned or for complexing with the transition metals to form a mixed $\pi$-ligand-$\pi$-carbollyl metal complex as hereinafter described comprise electron contributing reactants which have at least one atom with an unshared electron pair which is available for coordinate covalent or multicenter bonding. Examples of ligands include the halogens and compounds of nitrogen, oxygen, sulfur, arsenic, antimony, bismuth and phosphorus wherein the indicated element has a valence pair of unshared electrons. The reactants can contain only one of these atoms per molecule (monodentate); two atoms (bidentate); or a plurality of centers (polydentate). While not critical to their activity, a carbon content up to about 15 carbons per mole serves as a convenient limit in selecting ligands.

Examples of ligands include:

(1) Halides, e.g., chloro, bromo, fluoro and iodo;

(2) Oxygen compounds, e.g., water, carbon monoxide; alkyl, aryl and alicyclic hydroxy compounds such as alkoxys, e.g., methoxy, ethoxy, isopropoxy, dodecoxy, phenoxy, xyloxy, naphthoxy, cyclohexoxy, hexoxy, etc.; alkyl carbonyl or carboxyl compounds such as acetyl acetonate; aliphatic beta - iminoketones, e.g., 1 - methyl - 3-iminopropanone, 3 - isopropyl - 3 - iminopropanone, 1,3 - dibutyl - 3 - iminopropanone, 3 - isoamyl-3-iminopropanone, etc.; aliphatic hydroxy ketones and hydroxy aldehydes such as 2-hydroxy - 5 - acetyl acetophenone, 2-hydroxy - 4 - butyl benzaldehyde, etc.; alkyl and aryl peroxides, e.g., benzoyl peroxide, ethyl methyl peroxide, acetyl benzoyl peroxide, etc.; hydroxymonobasic, hydroxydibasic and dibasic aliphatic acids, ammonium and alkali metal salts and alkanol esters thereof such as glycolic acid, lactic acid, betahydroxy butyric acid, alphahydroxy butyric acid, glyceric acid, gluconic acid, maleic acid, oxalic acid, tartaric acid, citric acid, etc.; heterocyclic oxy compounds having from 3 to about 7 members in the heterocyclic ring and including the following parent compounds, the ring position isomers thereof and the alkylated derivatives thereof wherein from 1 to all the ring carbons are substituted with an alkyl or alkenyl group containing up to about 6 carbons, e.g., ethylene oxide, propylene oxide, styrene oxide, 2,3-epoxybutane, trimethylene oxide, 1,3-epoxyheptane, furans, tetrahydrofurans, pyrans, tetrahydropyrans, pyrones, dioxins, oxathioles, ixoxazoles, oxazoles, oxadiazoles, oxepins, oxazines, benzopyrans, benzopyrones, benzofurans, benzoisofurans;

(3) Nitrogen compounds such as nitric oxide ammonia, alkyl and aryl amines such as methylamine, diethylamine, isopropyl amine, trimethylamine, amylamine, dodecanol amine, cyanogen, hydrogen cyanide and aliphatic or aryl nitriles, e.g., acetonitrile, propionitrile, isbutyronitrile, acrylonitrile, adiponitrile, benzonitrile, terephthalonitrile, etc.; alkyl, cycloalkyl and aryl isocyanates such as ethyl isocyanate, isobutyl isocyanate, phenyl isocyanate, cyclohexyl isocyanate, etc.; alkylenediamines, N-alkylalkylenediamines, N,N'-alkyl-alkylenediamines and alkylenediaminecarboxylic acids and their salts such as ethylenediamine, N-methylethylenediamine, N-ethyl-ethylenediamine, N,N'-di-n-propylethylenediamine, propylenediamine, 2,3-dimethyl-2,3-diaminobutane, trimethylenediamine, 2-hydroxy-1,3-diaminopropane, tetramethylenediamine, pentamethylenediamine, ethylenediamine-N,N'-dipropionic acid, N-hydroxyethylethylene-diaminetriacetic acid, ethylenediaminetetraacetic acid, diethylene-triaminepentaacetic acid, etc.; heterocyclic nitrogen compounds having from 3 to 7 membered rings containing up to 3 or 4 hetero-atoms at least one of which is nitrogen including the parent compounds listed below their ring position isomers and the alkylated derivatives thereof wherein from 1 to all the ring carbon atoms are substituted with an alkyl or alkenyl group containing up to about 6 carbons, e.g., ethylene imine, trimethylene imine, pyrroles, isopyrroles, pyrazoles, triazoles, oxatriazoles, pyridines, pyridazines, pyrazines, piperazine, triazines, morpholine, azepine, indole, pyrindine, quinoline, isoquinoline, etc.; polyheterocyclic amines having at least one nitrogen in a bridgehead position such as 1,2,4-triazabicyclo(1.1.1)pentane, 5-thia-1,6-diazabicyclo(2.1.1)hexane, 1,4-diazabicyclo(2.2.2)octane (triethylene diamine), 1,3,5,7-tetrazabicyclo(3.3.1) - nonene(pentamethylenetetramine), 1,3, 5,7 - tetrazatricyclo(3.3.1.1)decane(hexamethylenetetramine), etc.

(4) Sulfur compounds such as sulfur dioxide, carbon disulfide and aliphatic mercaptans and sulfides such as methyl mercaptan, dodecyl mercaptan, dimethyl sulfide, diethyl sulfide, diisopropyl sulfide, dibutenyl sulfide, diamyl sulfide, ethyldecyl sulfide, methyldodecyl sulfide, etc.; heterocycic sulfides having from 3 to about 7 membered rings containing up to about 3 hetero-atoms at least one of which is sulfur and including the parent compounds listed below, their ring position isomers and the alkylated derivatives thereof wherein from 1 to all the ring carbons are substituted with an alkyl or alkenyl group having up to about 6 carbons, e.g., ethylene episulfide, thiophenes, tetrahydrothiophenes, thiobiazolones, thiobiazolines, thiodiazoles, thiodiazolidines, azosulfines, piazothioles, thiobiazolines, thionessals, thiochroman, bithiophenes, thiopins, thionaphthenes, isothionaphthenes, oxathioazines, etc.;

(5) Organic compounds containing at least one trivalent atom of phosphorus, bismuth, arsenic or antimony having an unshared pair of valence electrons. These compounds can be described by reference to emperical formulae as follows:

$$ER_3$$

or $$(R)_2ER'E(R)_2$$

wherein: E is a trivalent phosphorus, bismuth, arsenic or antimony atom; R is hydrogen, alkyl and cycloalkyl from 1 to about 8 carbon atoms, aryl from 6 to about 8 carbons or the halo amino and alkoxy derivatives thereof, and R' is alkylene from 1 to about 8 carbons. Examples of suitable ligands of the preceding formulae include: trimethyl phosphine, triethyl arsine, triisopropyl stibine, diethylchloro phosphine, triaminobutyl arsine, ethyldiisopropyl stibine, tricyclohexyl phosphine, triphenyl phosphine, triphenyl bismuth, tri-(o-tolyl)phosphine, phenyldiisopropyl phosphine, phenyldiamyl phosphine, diphenylethyl phosphine, chlorodixylyl phosphine, chlorodiphenyl phosphine, tris(diethylaminoethyl) phosphine, ethylene-bis-(diphenyl phosphine), hexamethylene - bis - (diisopropyl arsine), pentamethylene-bis-(diethyl stibine), etc.

(6) Unsaturated compounds such as the unsaturated hydrocarbons including unsaturated alicyclic and aliphatic hydrocarbons of 2 to about 15 carbons which form pi bonds with the metals. Examples of these are alkenes, e.g., ethylene, propylene, butene-1, butene-2, pentene, isooctene, decene-1, dodecene-2, octadecene, etc.; alicyclics such as cyclopentadiene, dichlorocyclopentadiene, fluorene, cycloheptatriene, tetraphenylcyclobutadiene, cyclopentadiene, etc.; aromatics such as benzene, naphthene, o-anisine, thiophene, indene, xylene, toluene, cumene, etc.

GROUP VIII METAL SOURCE

Group VIII metals readily form catalytically active complexes with the carbollide ions. The carbollyl-metal complex is formed by admixing a soluble salt or soluble complex of the metal with a solution of the carbollide anion. Examples of the Group VIII metals which form catalytically active carbollyl metal complexes with the carbollide ion include the iron subgroup comprising iron, cobalt and nickel, the palladium subgroup including ruthenium, rhodium and palladium, and the platinum subgroup including osmium, iridium and platinum.

Any of the preceding metals can be complexed with a carbollide anion by dissolving a suitable salt of the metal or a complex of the metal with one of the aforementioned ligands in a solvent and adding thereto a soluble salt of the carbollide salt or a solution of the salt. As apparent to those skilled in the art, the choice of the anion associated with the transition metal depends upon the solubility characteristics of the particular metal. Thus halide salts including bromides, chlorides, fluorides and iodides of the appropriate metals can be used, such as palladous chloride, ferric chloride, nickel chloride, cobalt fluoride, iridium bromide, etc. The nitrates can be employed such as palladium nitrate, osmium nitrate, etc.; the sulfates of the metals such as ferrous sulfate, cobalt sulfate, indium sulfate, etc.

Complexes of the metals with various ligands can also be employed as the source of the metal for the formation of the carbollyl metal complex. Any of the aforementioned ligands that form soluble complexes with any of the aforementioned ligands that form soluble complexes with any of the aforementioned metals can be employed. Examples of metal complexes which can be used include the following:

ferric acetylacetonate,
ammonium hexacyanoferrate (III),
cobalt tetraaminochloride,
tris(ethylenediamine)cobalt (III) chloride,
cobalt hexacarbonyl,
nickel hexacarbonyl,
bis(triphenylphosphine)nickel chloride,
nickelocene,
potassium hexafluororhenate (IV),
iron pentacarbonyl, hexacarbonyl-$\mu$-dicarbonyldicobalt,
nickel tetracarbonyl, ferrocene, bis(cyclopentadienyl)-rhenium hydride,
dibenzyliron,
dicarbonylcyclopentadienyliron hydride,
carbonyldicyanocyclopentadienylferrate,
cyanoferrocene,
ferrocenesulfonic acid,
dicarbonylcyclopentadienylruthenium hydride,
bis(cyclopentadienyl)ruthenium,
cyclooctadienylruthenium chloride,
osmocene,
acetyltetracarbonylcobalt,
dinitrosyl(tricyanomethyl) cobalt,
cobaltocene,
carbonyl tris(triphenyl)rhodium hydride,
bis(cyclopentadienyl)iridium(III) chloride,
diphenylnickel,
bis(acrolein)nickel,
di-$\mu$-chlorodichlorobis(ethylene)dipalladium,
bis(cyclopentadienyl)palladium,
allylcyclopentadienylplatinum,
dichlorobis(ethylene)platinum, etc.

COMPLEX PREPARATION

The metal complex can be formed by admixture of a solution of the carbollide ion formed as previously mentioned, with a solution of a salt or ligand complex of the particular metal. As previously mentioned, when aqueous concentrated base is used for the boron abstraction of the dicarborane, a metal ligand complex is preferably present, so this preparation results in a one-step synthesis of the carbollyl metal complex from the carborane. Generally, however, the carbollide anion is prepared first and the carbollyl metal complexes are formed from a solution of the dicarbollide anion or from the monocarbollide anion.

A carbollyl metal complex can be prepared by simply admixing a soluble salt or ligand complex of the metal with a soluble form of the carbollide anion in an inert solvent. A suitable inert solvent that can be used in the preparation is tetrahydrofuran. Other solvents include any of the solvents hereinafter described under the section entitled "Solvents." To this solvent can be added a soluble salt, e.g., ferrous chloride and a soluble salt of the carbollide anion such as sodium carbollide is thereafter added. Preferably the carbollide solution is prepared in tetrahydrofuran and thereafter added to a tetrahydrofuran solution of the indicated metal salt. The resultant carbollyl metal complex can be crystallized by evaporation of the solvent to obtain a crystalline residue. When the carbollyl metal complex is an anion and is present as an alkali metal salt it can be dissolved in water and purified by filtration through a suitable adsorbent, e.g., diatomaceous earth. The carbollyl metal complex can be recovered from the aqueous solution by precipitation with a suitable base exchange material, e.g., an aqueous solution of a tetramethyl ammonium salt. When this procedure is performed in the absence of any free ligand, a bis complex or a di-$\pi$-carbollyl metal complex is formed. The structure of such a bis-carbollyl metal complex is illustrated in FIG. 3. The complex can also be formed in the presence of an excess quantity of another ligand such as any of the aforementioned ligands which are capable of forming bonds with transition metals. Accordingly, the formation of the carbollyl complex in the presence of any of the aforementioned ligands would prepare the mono-$\pi$-carbollyl mono-ligand metal complex. Thus reaction of the metal salt with the carbollide ion in the presence of a cyclopentadienide ion would form the complex as illustrated in FIG. 4; reaction of the metal salt, the carbollide ion, and tetraphenylcyclobutadiene would prepare the complex illustrated in FIG. 6. Use of the metal carbonyls as the source of the metal would similarly form the carbonyl-mono-$\pi$-carbollyl metal complex illustrated in FIG. 5.

The carbonylcarbollyl metal complexes also dimerize in a manner similar to the dimerization of the metal carbonyls. The carbonyldicarbollylferrate(III) will dimerize to carbonyldicarbollyliron(III)-$\mu$ - dicarbonyl-carbonyl-dicarbollyliron(III), a divalent anion. An example of another dimer is carbonyldicarbollylcobalt(III) - $\mu$-dicarbonylcarbonyldicarbollylcobalt(III), also a divalent anion.

Examples of carbonyl metal complexes which can be formed by the preparation disclosed herein are listed in the following table. For simplicity, when the complex has a net negative charge, the cation associated with the complex ion is not included. Examples of such are the alkali metal, ammonium, organic ammonium cations, e.g., sodium, lithium, potassium, ammonium, tetramethylammonium, ethylammonium, etc. Examples of anions associated with cationic complexes are halides, e.g., chlorides, fluoride, etc.; nitrate, sulfate, phosphate, etc.

cyclopentadienyldicarbollyliron(III)
cyclopentadienyldicarbollylferrate(II)
bisdicarbollylferrate(II)(III)
cyclopentadienyldicarbollylcobalt(III)
cyclopentadienyldicarbollylnickel(III)
cyclopentadienyldicarbollylnickelate(II)
bisdicarbollylrhenium(IV)
bisdicarbollyliridium(IV)
bis-C-aminomonocarbollylplatinum(II)
cyclopentadienyldicarbollyliridium(III)
bisdicarbollylpalladium(IV)
bisdicarbollylpalladate(II)(III)
bismonocarbollylferrate(III)
bismonocarbollylnickelate(IV)
bis-C-aminomonocarbollylnickelate(IV)
bis-C-ammonylmonocarbollylnickel(IV)
tris(diethylsulfide)monocarbollylosmium(III)
bisdicarbollylrhodate(II)(III)
trichlorodicarbollylpalladium(IV)
bisdicarbollylplatinum(IV)
cyclopentadienyl-B-ethoxydicarbollyliron(III)phosphate As previously mentioned, the substitution of the carbon or boron atoms that lie in the face of the truncated icosahedron somewhat affects the oxidation potential of the catalyst. Although substitution of these atoms generally decreases the catalytic activity, the substitution with suitable groups can nevertheless be desirable.

To illustrate, solubility in non-polar reaction solvents such as hydrocarbons, e.g., olefins or aromatic reactants can be promoted by substitution of an alkyl or aryl group on the 1,2-carbon atoms of the carbollide. Similarly, the choice of the particular carbollide also influences solubility. To achieve solubility in non-polar solvents or reactants, the carbollides are chosen to obtain a complex with a net charge of zero. By proper selection of the, ligands, a neutral complex can be achieved with most oxidation states of the Group VIII metals. To illustrate, the cyclopentadiene ion (−1) and dicarbollide ion (−2) ligands can be used with metals having a valency of +3, e.g., ferric, cobaltic, etc. For oxidation states of +2, neutral ligands such as carbon monoxide can be used with the dicarbollide ion. Metals in an oxidation state of +4 (valency) can be complexed into a neutral species with two dicarbollide (−2) anions or with a mono-negative ligand such as a cyclopentadiene ion and a mono-carbollide ion (−3) ligand. Metals can be complexed with an oxidation state of +5 valency with a mixture of monocarbollide ion (−3) and dicarbollide ion (−2) ligands. The metals can be complexed at a valency of +6 with two monocarbollide anions (−3).

Since the charged complexes are readily soluble in polar solvents and since most oxidations are performed in such polar solvents, I prefer to combine ligands that will provide a charged complex with the Group VIII metal. The preceding table includes a number of such charged complexes that are readily soluble in polar solvents. Although the metal tends to acquire the oxidation state which renders the complex neutral, charged complexes can nevertheless be obtained by reduction or oxidation of the complex. To illustrate, treatment with oxygen or ozone at temperatures from 0°–500° C. can effect a change to a positively charged complex. Treatment at these temperatures with a reducing agent, e.g., hydrazine, hydrogen, alkali metal, borohydrides, alkali metal dithionates will effect a change to a more negatively charged complex. In this manner, the metal oxidation state can be varied to control the solubility of the complex.

CATALYSIS

The highly electron deficient carbollide ion, i.e., structure having a large number of unfilled orbitals including the five $SP^3$ lobes on the face of the truncated icosahedron, imparts to the carbollide ion a highly electrophilic nature. The carbollide ion when complexed with any of the aforementioned transition metals stabilizes high oxidation states of the transition metals and secures many of the metals in oxidation states not heretofore achieved. Illustrations of this characteristic is in the ability of the carbollide ion to stabilize cobaltic (III) and (IV) state in the di- and mono-, respectively, carbollyl-cobalt complexes and in the ability of the carbollide to form tetravalent nickel (IV), palladium (IV), etc. This property activates the metals for catalysis of various oxidative reactions. Particularly applicable reactions include any reaction wherein the reactant or at least one of the reactants forms a transient complex, generally a coordination complex, with the metal. This complex can be formed in heterogeneous or homogeneous catalysis in vapor or in liquid phase and the highly electron deficient carbollyl group greatly activates metals for the complex formation.

The carbollyl metal complexes also have the ability to change metal oxidation states without a change in their structure. This permits the complex to undergo thermodynamically reversible changes in oxidation states and the oxidation or reduction potential of any state of a dicarbollyl metal complex can be controlled somewhat by the identity of substituents on the face boron or carbon atoms that project into the $h_{ag}$ orbital; see the previous discussion of oxidation potentials of the phenyl and dimethyl derivatives of bis-π-(1)2,3-dicarbollyl iron and cobalt complexes. Accordingly these complexes can be used as redox agents in oxidations, reductions, polymerizations, etc.

The complexes can also be teamed with other redox agents, salts or complexes of multivalent metals or organic redox agents such as benzoquinone, anthraquinone, naphthoquinone, phenanthraquinone and their halo, cyano or alkyl derivatives thereof, e.g., tetrachlorobenzoquinone, dichlorodicyanonaphthoquinone, etc.

Other redox agents that can be employed include nitrogen oxides such as nitrogen dioxide, nitric oxide which can be introduced in vapor form into the reaction zone. Preferably, for liquid phase processing. nitric or nitrous acids or their soluble salts such as the alkali metal or ammonium salt, e.g., sodium nitrate, lithium nitrate, ammonium nitrate, etc., are included in the reaction medium. The nitrogen oxides, their acids and salts aforementioned, are particularly useful redox agents because they also serve as free radical precursors and thereby reduce or eliminate any induction period for initiation of the reaction and also serve to accelerate the oxidation rate.

Examples of multivalent metals that can be used as redox agents include copper, iron, vanadium, manganese, chromium, molybdenum or tantalum. These redox agents are preferably used as soluble salts or complexes with any of the aforementioned ligands, particularly when liquid phase processing is used.

The redox agent can be used in an amount comprising from 0.1 to about 5000 parts per part by weight of the carbollyl Group VIII metal complex; preferably from 10 to about 1000 parts per part by weight.

Various free radical precursors can also be included in the reaction medium to eliminate any induction period for the oxidation and to increase the rate of oxidation. The precursors that can be used include organic and inorganic peroxides, e.g., hydrogen peroxide and alkali metal peroxides such as sodium peroxide, lithium peroxide, etc. Inorganic peracids and salts thereof such as persulfuric acid and soluble persulfates, perchloric acid and soluble perchlorates, permanganic acid and soluble permanganates. The soluble salts of these peracids can be an alkali metal, alkaline earth metal, ammonium cation or can be any of the multivalent metal cations previously described as useful redox agents.

The organic peroxides include alkyl and aryl peracids, suitably those having from 2 to about 9 carbons, e.g., peracetic, perisopropionic, pervaleric, peroctanoic acids, benzoyl peroxide, cumyl peroxide, etc. Aliphatic or aryl aldehydes or alcohols are also peroxide precursors when oxygen is introduced into the reaction zone and examples of useful aldehydes or alcohols having from 2 to about 9 carbons include: acetaldehyde, benzaldehyde, propionaldehyde, isobutyraldehyde, valeraldehyde, toluoyl aldehye, methanol, isopropanol, phenol, cumenol, ethanol, octanol, isobutanol, cresol, etc.

Other free radical precursors that can be included and that will release free radicals at the reaction conditions include the homolytically fissionable aliphatic and aromatic azo compounds, having from 2 to about 20 carbons, e.g., phenylazomethane, phenylazopropane, p-tolylazobutane, diazomethane, methylazobutane, azobisisobutane, aziobistoluene, azobisisopropane, etc.

Electrochemical means can also be used, e.g., use of the dicarbollide complex in the anolyte of an electrochemical cell employed for the olefin oxidation such as disclosed in U.S. Pats. 3,147,203 and 3,248,312. While the combination of any of the metal salts or ligands with and particular dicarbollyl metal complex can be varied in accordance with the oxidation/reduction potential, in the reaction medium, of each component relative to potential of the other component, the following are illustrative combination.

| Carbollyl metal complex: | Other redox |
|---|---|
| $[(B_9C_2H_{11})_2Fe]^{-1}$ | Cupric chloride. |
| $[(C_6H_5)Fe(B_9C_2H_{11})]°$ | Magnesium acetate. |
| $[(B_9C_2H_{11})_2Pd]°$ | Cupric bromide. |
| $[(B_9C_2H_{11})_2Ni]°$ | Ferric iodide. |
| $[(B_9C_2H_{11})_2Pt]°$ | Vanadyl bromide. |
| $[(B_8C_2H_{10}BOC_4H_4)_2Pd]°$ | Nitric acid. |
| $[(C_6H_5)_4C_4IrB_9H_9C(C_6H_5)_2]°$ | Chromium acetylacetonate. |
| $[(CO)_3RhB_9C_2H_{11}]°$ | Cupric nitrate. |
| $[B_9C_2H_{11}Co(CO)_2CO]_2°$ | Lithium nitrate. |
| $([B_8C_2H_5Cl_5BS(C_2H_5)_2]_2Os)°$ | Cupric chloride. |
| $[(B_{10}H_{10}CNH_2)_2Ni]^{-2}$ | Ferric bromide. |
| $[(B_{10}H_{10}CNH_3)_2Co]°$ | Bis(indenyl)molybdate trichloride. |
| $[(B_{10}H_6F_4CNH_2)_2Pd]^{-2}$ | Cupric nitrate. |
| $[C_5H_5RuB_{10}H_{10}CNH_2]°$ | Nitric acid. |

The carbollyl metal complexes have a remarkable stability. Once a complex is formed, the metal is so highly complexed that it is virtually resistant to any displacement and can be recovered only by destruction of the carbollyl group. This can be accomplished with concentrated nitric acid (hypergolic) or by ignition in oxygen or air, etc. and recovery of the metal from the ash. Otherwise, the complexes are highly stable and can be heated to elevated temperatures (300° to 700° C.) without decomposition. At such elevated temperatures, some of the complexes sublime and when cooled condense in unchanged form.

The ability of the carbollyl group to stabilize high oxidation states of metals profoundly affects the catalytic behavoir of the metals when they are complexed. The Group VIII noble metals can be stabilized at the tetravalent state (IV) and thereby become very active oxidation catalysts. The carbollyl cobalt (III) or (IV) complex can serve as an oxidation catalyst for various oxidation liquid phase processes such as the oxidation of alkaryl and alkyl hydrocarbons to carboxylic acids; etc. The highly electrophilic nature of the dicarbollide also activates metals for catalysis of the reactions which heretofore have required the use of more electron deficient transition metals, e.g., the carbollyl complex of the iron group metals can be employed for the catalysis of reactions which have heretofore only been catalyzed by the Group VIII noble metals. Examples of such are oxidation of olefins to carbonyl compounds, acids and esters.

The oxidation of hydrocarbons such as alkyl, alkaryl, substrates including ethane, propane, butane, pentane, hexane, heptane, octane, as well as paraffin distillates, e.g., naphtha, kerosene, and higher boiling paraffinic hydrocarbons such as octadecane, paraffin wax, lubricating oils, etc.; aromatic compounds such as benzene, toluene, xylene, pseudocumene, cumene, durene, ethylbenzene, beta-methylnaphalene, dimethylnaphthalene, diamylnaphthalene, etc.; cyclohexane, methylcyclopentane, cycloheptane, cyclooctane, etc., can be performed by contacting the indicated hydrocarbon with oxygen in the presence of the dicarbollyl metal complex. In general, temperatures from about 25° to about 350° C. and pressures from about atmospheric to 1000 atmospheres can be employed. The reaction can be performed in liquid phase similar to homogeneous catalysis or the reaction can be performed in the vapor phase. When liquid phase reaction conditions are employed, the catalyst can be dissolved in a suitable inert solvent such as indicated hereinafter under the Solvents heading. Preferred solvents are alkyl or aryl carboxylic acids having from 2 to about 8 carbons, e.g., acetic, benzoic acids, etc. When vapor phase reactions are performed, the catalyst can be employed neat or distended upon a suitable carrier such as hereinafter mentioned under the Solid Catalyst heading. Examples of various dicarbollyl metal complexes which can be used in these oxidations include the dicarbollyl complexes of Group VIII metals such as cobalt, iron, palladium, platinum, etc. Particularly useful applications include the use of the carbollyl complexes of the Group VIII metals and particularly the complexes of cobalt wherein the cobalt is in the +3 and +4 oxidation states as catalysts for the oxidation of alkyl-aromatics such as p-, o-, or m- xylenes and alkyl benzoic acids, e.g., paraxylene and toluic acid, to polycarboxylic aromatic acids, e.g., phthalic acids. Other oxidations in which carbollyl complexes of the higher oxidation states of the Group VIII metals and, again, particularly the cobalt [+3] and [+4] complexes, can be used include the oxidation of cyclohexane, cyclohexanol, cyclohexanone or mixtures thereof to adipic acid. In these applications, vaor or liquid phase processing can be used by contacting the catalyst with a mixture of oxygen and the reactant feed material.

Various olefinic and acetylenic hydrocarbons can also be oxidized to more valuable oxygenated derivatives thereof and this oxidation can be catalyzed by the dicarbollyl metal complexes in accordance with my invention. This oxidation is presumed to proceed through the oxidation of a π-olefin metal complex which is oxidized to the desired product. Heretofore this reaction has only been catalyzed by the Group VIII noble metals and the commercialization of this technique has only employed the use of palladium containing catalysts. I have found, however, that the highly electrophilic nature of the dicarbollide structure activates the iron group metals for this catalysis. In this manner the dicarbollyl metal complexes of all of the Group VIII metals can be used for the oxidation of olefinic hydrocarbons to carbonyls, unsaturated esters, unsaturated ethers and acetals, acids, etc. Suitable olefins that can be oxidized to more valuable compounds include any hydrocarbon olefin having from 2 to about 25 carbons. Examples of suitable olefins are: ethylene, propylene, butene-1, butene-2, pentene-1, pentene-2, hexenes, heptenes, isooctene, octene-1, 3-ethylpentene-1, nonene-3, decene-1, eicosene, heptadecene-1, pentacosene, docosene, butadiene, pentadiene, octadiene, cyclopentene, methylcyclopentene, butylcyclopentene, cyclohexene, ethylcyclohexene, isopropylcyclohexene, styrene, allylbenzene, vinylnaphthalene, indene, butenylnaphthalene, etc. Preferred olefins are those having from 2 to about 10 carbons and, in particular, ethylene because of the established market of ethylene derived oxygenated products such as acetaldehyde, acetic acid, vinyl ethers, which are obtained by pyrolysis of the acetal oxidized product and the vinyl esters such as vinyl acetate, vinyl propionate, vinyl benzoate, propenyl valerate, vinyl toluate, etc.

The oxidation is performed at relatively mild conditions including temperatures from about 15° to about 300° C. and pressures from about atmospheric to about 1000 atmospheres as desired. The reaction can be performed in liquid phase with the dicarbollyl metal complex dissolved in a suitable inert solvent or liquid reactant or the reaction can be performed in vapor phase employing the dicarbollyl metal complex neat or distended upon a suitable carrier. Examples of various inert solvents that can be used for the liquid phase catalysis are set forth hereinafter under the heading Solvents. Examples of suitable carriers which can be used to support the catalyst in the heterogeneous vapor phase reaction are also set forth hereinafter under the heading Solid Catalysts.

This reaction is performed by contacting the olefin, oxidant and an anion-contributing reactant in the presence of the dicarbollyl metal complex at the aforementioned conditions. Examples of suitable anion-contributing reactants include water and aqueous mineral acids, e.g., nitric, hydrochloric, sulfuric, hydrobromic, etc. with pH values from 0.1 to about 7, preferably from 1 to about 5, to produce aldehydes, ketones and acids from olefinic compounds such as acetaldehyde, methylethyl ketone, acetone, cyclohexanone, acetophenone from, respectively, ethylene, butene-1, propylene, cyclohexene, styrene, wherein the oxo atom replaces a hydrogen atom on a secondary ethylenically unsaturated carbon.

When the oxidation is performed in the presence of a carboxylate donating reactant, a hydrogen atom on an allylic or vinylic carbon of the olefin is replaced with the carboxylate group, thereby obtaining a carboxylate ester of an unsaturated alcohol. Vinyl; propenyl, allyl and isopropenyl; butenyl; methylallyl and isobutenyl carboxylate esters are produced from, respectively, ethylene, propylene and butene-1. Similarly, unsaturated esters are produced from the higher molecular weight olefins described as reactants herein. Suitable carboxylate donating reactants comprise the alkanoic and aromatic acids having from 2 to about 12 carbons, e.g., acetic, propionic, butyric, isobutyric, valeric, caproic, capriylic, decanoic, lauric, 2-ethylhexanoic, pivalic, benzoic, phthalic, toluic, ethylbenzoic, hexylbenzoic, naphthoic, 1-methyl-2-naphthoic, etc. Also useful are the soluble salts of these acids such as the alkali metal, e.g., sodium, potassium, lithium, cesium, the ammonium or the alkaline earth, e.g., calcium, magnesium, barium, etc., salts of the aforementioned carboxylic acids.

When the oxidation is performed in the presence of an alcohol, acetals, ketals and unsaturated ethers are produced. The oxidation comprises replacement of a hydrogen from a vinylic carbon of the olefin by an alkoxy or aryloxy group to yield an unsaturated ether. The latter product generally adds an additional mol of alcohol across the double bond to form acetals or ketals from the aforementioned olefins. Examples of reactive alcohols include the monohydroxy alkyl and aryl alcohols having from 1 to about 12 carbons, e.g., methanol, ethanol, isopropanol, butanol, pentanol, 2-ethylhexanol, octanol, isooctanol, decanol, dodecanol, phenol, cresol, p-ethylphenol, m-hexylphenol, naphthol, 6-methyl-$\alpha$-naphthol, etc. In this reaction, from 0.1 to about 5.0 weight percent of the alcoholic reactant can comprise a strong mineral acid such as hydrochloric, hydrobromic, sulfuric, nitric, perchloric since the oxidation rate is increased in the presence of the mineral acid.

SOLVENTS

The homogeneous catalysis in liquid phase can be achieved using various organic liquids as solvents for one or more of the reactants or the catalyst. Water or aqueous solutions of mineral acids can be used. Various organic liquids can also be employed such as sulfoxides, sulfones, amides, ketones, ethers and esters. Carboxylic acids can also be used such as the low molecular weight fatty acids or aromatic carboxylic acids.

Illustrative of the last class of solvents are formic, acetic, propionic, butyric, pentanoic, hexanoic, heptanoic, octanoic, benzoic, toluic, phthalic acids, etc. Of these, the fatty carboxylic acids having from about 2 to about 8 carbons are preferred.

Other organic solvents that can be employed include the alkyl and aryl sulfoxides and sulfones such as dimethyl sulfoxide, propylethyl sulfoxide, diisopropyl sulfone, decylmethyl sulfoxide, butylamyl sulfone, diisooctyl sulfoxide, diphenyl sulfoxide, methylbenzyl sulfone, etc.

Another class of organic solvents that have sufficient solvency for the catalyst and that are inert to the oxidative carbonylation are various amides such as formamide, dimethyl formamide, ethylisopropyl formamide, acetamide, n - phenylacetamide, N,N - dipropylacetamide, iso-butyramide, N-ethylisobutyramide, isovaleric amide, N,N-dimethylisovaleric amide, isocaprylic amide, N,N-methyl-n-caprylic amide, N-propylene-n-heptanoic amide, iso-undecylic amide, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolacetone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

Hydrocarbon solvents can be used, particularly when the catalyst is a neutral complex, i.e., when $x=0$. The neutral complex is soluble in non-polar solvents such as hydrocarbon and examples of useful hydrocarbons are: pentane, butane, hexane, octane, benzene, toluene, xylene, kerosene, naphtha and other mineral oil distillates. The halogenated hydrocarbons such as carbon tetrachloride, trifluorotrichloroethane, chlorobenzene, dichlorobenzene, o-bromotoluene, $\alpha$-chloronaphthalene, pentachloroethane, bromoform, n-butyl bromide, etc., can also be used.

SOLID CATALYSTS

The catalyst can also be employed in heterogeneous vapor phase catalysis by employing the catalyst neat or supported on a suitable inert support. In general, any support or carrier which is a solid and inert to the reaction can be used such as titania, zirconia, alumina, silica, etc., or combination of these materials. Examples include alumina, silica stabilized alumina containing from 1 to 15 percent silica as described in U.S. Pat. 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of 1 or more exchangeable cations such as sodium, potassium, hydrogen, magnesium, calcium, etc. The compositions and their preparation are described in U.S. Pats. 2,882,243 and 2,882,244. These compositions are characterized by crystal pores of relatively uniform pore diameter between about 5 and 14 Angstrom units. Several crystal forms of such molecular sieves are available and suitable for use herein as the carrier for the dicarbollyl metal complexes of my invention including the X, Y, L and J crystal types. The sieves can be treated prior to deposition of the aforementioned catalytic metals by ion exchanging the monovalent alkali metal action with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of the Group VIII or Group VIII and VI–B metal salts in the manner hereafter set forth.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors.

which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The dicarbollyl metal component of the catalyst when distended on a solid carrier can be employed in an amount from about 0.01 to about 25 weight percent of the final catalyst. Preferably the dicarbollyl metal complex is employed in a concentration from about 0.5 to about 5 weight percent based on the final catalyst. The dicarbollyl metal complex can be distended on the carrier by impregnation of the carrier with a solution of the dicarbollyl metal complex or sublimation of the complex onto the carrier. The carbollyl metal ion can be used to form integral portion of crystal lattice in molecular sieve, e.g., the $\pi$ - cyclopentadienyl-$\pi$-4-tetrahydrofurandicarbollyl iron(III) can be precipitated as the insoluble orthophosphate, $[\pi\text{-}C_6H_5Fe\pi\text{-}B_8H_8C_2H_2BC_4H_8O]_3PO_4$ during the formation of the aluminosilicate gel for the molecular sieve and thereby be incorporated into the molecular sieve. In this method the solid carrier can be treated, immersed or washed with a solution of the dicarbollyl metal complex and this solution can be treated to precipitate the dicarbollyl metal complex on the carrier by reaction with a precipitating cation such as a cesium or trimethylammonium salt. The dicarbollyl metal complex can also be impregnated on the carrier by immersing the carrier in a solution of the dicarbollyl metal complex and evaporating the solvent therefrom. The resulting catalyst can be dried and repeated impregnations can be employed if desired to raise the concentration of the dicarbollyl metal complex to the desired level.

The invention will now be described with reference to the examples of which:

Example I illustrates the preparation of the di- and mono-carbaclovododecaborane and its carbon substituted derivatives.

Example II illustrates the preparation of the (3)1,2- and (3)1,7-dicarbadodecahydroundecaborate anions from the carboranes of Example I and the preparation of the dicarbollide anions therefrom.

Example III illustrates the preparation of B-ligand substituted 1,2-dicarbadodecahydroundecaborane and its C-constituted derivatives.

Example IV illustrates the preparation of the carbollyl metal complexes of the iron group metals.

Example V illustrates the preparation of the carbollyl metal complexes of the Group VIII noble metals.

Example VI illustrates the use of the carbollyl metal complexes in the catalysis of oxidations.

EXAMPLE I

Preparation of carborane

This example illustrates the preparation of 1,2-dicarbaclovododecaborane(12) from decaborane and acetylene. The preparation is performed in a one-liter round-bottom, three-necked flask which is fitted with an automatic temperature control device in one of the necks, a spark-free stirring motor with a stirring rod extending through the center neck, and a water-cooled condenser attached to the remaining neck. The condenser connection has a concentric tube used for introduction of acetylene and this tube is extended to beneath the liquid level of the reactants in the round bottom flask. The water-cooled condenser is placed upright for total reflux and the upper end of the condenser is fitted with a U-shaped, Dry Ice-cooled condenser and the gases from the Dry Ice condenser are passed into an empty 125 milliliter Erlenmeyer flask and then below the liquid level of a similar flask partially filled with oil.

The gas introduction train consists of a nitrogen cylinder and an acetylene cylinder which are manifolded into a purification train comprising a first 1000 milliliter Erlenmeyer flask and then three 500 milliliter round-bottom flasks connected in series having gas introduction tubes at the bottom of the flask fitted with extra coarse gas dispersion tubes and filled from ⅓ to ½ with concentrated sulfuric acid. The gas exit from the last purification flask is passed to an empty 1000 milliliter Erlenmeyer vessel and then to the base of a column three feet in height that is packed with a mixture of potassium hydroxide and a drying agent such as anhydrous calcium sulfate. The top of the column is connected to another empty 1000 milliliter Erlenmeyer flask and the gases are removed from this Erlenmeyer flask and passed to the tube extending through the neck of the 1000 milliliter reaction vessel. The empty Erlenmeyer flasks are employed to serve as traps for liquids which may inadvertently back up through the system. The empty trap between the sulfuric acid and the potassium hydroxide column is used to collect any sulfuric acid foam from the last purification vessel.

The system is thoroughly dried and flushed with nitrogen before the reagents are introduced. Thereafter 100 grams of decaborane which has been purified by sublimation or recrystallization from a hydrocarbon such as heptane is dissolved in 200 milliliters of ni-propyl ether which has been freshly distilled from a mixture containing sodium and benzophenone. The solution is placed in the 1000 milliliter 3-necked flask and 200 milliliters of diethyl sulfide which has been dried by passage over a dehydrated 4-angstrum molecular sieve is thereafter added. Nitrogen is then passed through the flask while the solution is stirred for three hours at 40° C. and then the temperature is raised to 65°–67° C. and maintained at this temperature for two hours. Thereafter the flask contents are heated to the temperature of 85°±2° C. and 7 mols of acetylene are passed through the purification train and into the reaction vessel over a period of 35 hours. On completion of the reaction the solution has a pale yellow to light orange color.

The reactants are then cooled to room temperature and the reaction mixture is transferred to a one-liter, round-bottom, single-neck flask and the diethyl sulfide and n-propyl ether solvent is removed in a vacuum evaporation step. The flask is rotated continuously during the evaporation and is heated with a steam bath. The volatiles are condensed and collected in a dry ice trap. Upon removal of the solute and diethyl sulfide the product is a light brown semisolid. The solid is dissolved in 150 milliliters of benzene and the solution is then transferred to a three-liter, three-necked flask fitted with a stirrer, condenser and pressure equilized, closed addition funnel. The addition funnel is also fitted with a connection to a source of nitrogen so that nitrogen can be used to purge and sweep the flask contents. Over a two-hour period a solution of 150 milliliters of acetone, 400 milliliters methanol and 150 milliliters concentrated hydrochloric acid are introduced into the flask to convert the reactive byproducts to hydrogen and borates. The flask contents are stirred for an additional 12 hours until no more gas is evolved and the resultant solution is then placed in a one-liter addition funnel and added slowly to three gallons of water maintained at a temperature of 95°–100° C. Some decomposition of additional byproducts occurs; the hydrochloric acid and acetone are extracted into the water phase and the benzene is evaporized from the system. The aqueous mixture is stirred for an additional 10 minutes and the crude carborane which separates as a solid in the aqueous phase is removed and dissolved in 500 milliliters methanol in a two-liter Erlenmeyer flask.

The crude carborane is then purified by the addition of a solution of 50 grams potassium hydroxide in 75 milliliters of water and agitated for 3 minutes, then poured into 3 gallons of ice water, stirred for 10 minutes, and filtered. The filtered solid is then dried in a vacuum over phosphorus pentoxide and the dried product is mixed with 30 grams anhydrous calcium chloride and placed in thimble of a Soxhlet extraction apparatus. The mixture is extracted with 500 milliliters of heptane for 20 hours. The carborane is recovered from the heptane by crystallization and filtration by placing the heptane in a rotary evaporator heated with a steam bath to evaporate the heptane to 50 milliliters. After separation of the carborane, the filtrate is cooled and a second crop of carborane is obtained. The combined yield after drying is about 85 grams and an additional 3 to 4 grams of impure material may be obtained by evaporating the hexane solution to dryness. In repeated runs this impure material can be added to the mixture in the Soxhlet thimble for further purification.

Preparation of bromomethylcarborane

The following illustrates the preparation of 1-bromomethyl-1,2-dicarbaclovodecaborane(12). A three-necked flask and the apparatus described in the previous experiment is employed in the preparation of the bromomethyl carborane. The reaction flask is purged and filled with nitrogen, then charged with 49.9 grams decaborane, 32 milliliters acetonitrile, 35 milliliters propargyl bromide and 350 milliliters of benzene. The solution is stirred and heated at reflux temperature for two hours and thereafter the introduction of the propargly bromide is initiated by introduction of 11 milliliters of the propargyl bromide through a nitrogen-filled addition funnel dropwise over a one-hour period. The addition funnel is then removed, the flask stoppered and the solution is maintained at reflux temperature for 1½ hours and then the flask is unstoppered, the addition funnel is replaced, and an additional quantity of 11 milliliters propargyl bromide is introduced. After 1½ hours of stirring of the flask contents at reflux temperature, the remainder of the propargyl bromide is introduced and the flask contents are again stirred for 1½ hours at reflux temperature.

The solution is then cooled to room temperature, and washed with benzene into a single necked flask. The solvent is removed from the flask using a water aspirator vacuum and gentle heating from a steam bath. The residue in the flask is then cooled to room temperature, removed from the vacuum and 200 milliliters of hexane is added and stirred with the residue to extract most of the carborane. The hexane extract is decanted and the brownish tar is again extracted with 40 milliliters of hexane. The second extraction converts the tar residue to a solid which is removed by filtration and washed on the filter with an additional 40 milliliters of hexane. The combined hexane extracts are filtered and washed in a separatory funnel with four 100 milliliter portions of chilled aqueous 10 weight percent sodium hydroxide solution and then with four 100 milliliter portions of water. The hexane solution, yellow in color, is dried over anhydrous magnesium sulfate and filtered and the solvent is then evaporated in a rotary evaporator using a water aspirator.

The carborane remaining in the evaporator flask is washed with a small amount of pentane into a single necked 300 milliliter flask which is attached to an alembic column. Glass wool is placed in the solution, in the neck of the alembic distillation column, and at the top of the column to inhibit bumping during the distillation. The distilling flask, collecting flask and column are continuously evacuated with a high vacuum system. When the bulk of the pentane and residual hexane have distilled away, the temperature of the water bath surrounding the distillation flask is raised from room temperature to 125° C. over a one-hour period. When the distillation rate slows appreciably, the flask contents are raised to 150° C. and maintained there until no more distillate is obtained. The distillation flask is then cooled to room temperature, the vacuum is reduced on the system, and the product is removed to recover 86.5 grams of distilled product. The bromomethyl carborane may be further purified by crystallization from pentane or methanol if desired.

Preparation of methylcarborane

The following describes the preparation of 1-methyl-1,2-dicarbaclovodecaborane(12). This material is prepared by hydrolysis of the Grignard reagent formed from the reaction of bromomethylcarborane; see the preceding preparation; with magnesium in the presence of diethylether. The preparation is carried out in a one-liter, 3-necked flask equipped with a mechanical stirrer, reflux condenser, pressured equalized, closed addition funnel and nitrogen inlet. The flask is maintained filled with nitrogen throughout the course of the reaction. The flask is charged with 6.1 grams magnesium chips, 50 milliliters of anhydrous diethylether, warmed to 30° C., and then a solution of 50 grams of distilled bromomethylcarborane dissolved in 300 milliliters of anhydrous diethylether is introduced slowly into the flask while the flask contents are stirred. The flask is gently warmed to reflux temperature and then the heating mantle is removed and the addition of the carborane solution is maintained at a rate sufficient to maintain the reflux temperature. The bromomethylcarborane solution is added within about 35 minutes and the stirred reaction mixture is then maintained at reflux temperature by heating for 2½ hours.

The solution is then cooled to room temperature and is decanted from the excess magnesium into a 2-liter beaker half-filled with crushed ice. The carboranyl magnesium bromide is washed into the ice mixture with two 50 milliliter portions of diethylether. Hydrochloric acid of 3 normality in a sufficient quantity to dissolved the magnesium salts is added to the stirred ice mixture and the ether and water layers are separated. The water layer is extracted three times with 75 milliliter portions of diethylether. After the combined ether extracts are dried over anhydrous magnesium sulfate, the ether is removed in a rotary evaporator. The evaporator flask contents are then dissolved in 90 milliliters of hot methanol and the solution is permitted to cool slowly to 0° C. The methyl carborane crystallizes from the methanol and is filtered therefrom. A portion of the methanol liquor is removed, heated and water added to the solution until it becomes cloudy. The solution is then cooled to 0° C. to obtain an addition crop of methyl carborane crystals. The combined crops are dried in a vacuum to yield 31 grams of methyl carborane.

Preparation of dimethylcarborane 1,2-dimethyl - 1,2 - dicarbaclovodecaborane(12) is prepared by the hydrolysis of the Grignard reagent formed from the reaction of bromomethylcarborane with magnesium in the presence of tetrahydrofuran.

A 1-liter three-necked flask equipped with a mechanical stirrer, reflux condenser, addition funnel and nitrogen inlet is thoroughly dried and flushed with nitrogen. Into the flask is placed 6.1 grams of clean magnesium chips and about 15 milliliters of tetrahydrofuran. The closed addition funnel is charged with 50 grams of distilled bromomethylcarborane dissolved in 250 milliliters of tetrahydrofuran. About 50 milliliters of the solution is then rapidly added to the stirred magnesium suspension to cause initiation of the Grignard reaction. The rate of addition is controlled thereafter so that the heat of the reaction is sufficient to maintain reflux temperature. After addition is complete, the flask is maintained at reflux temperature for an additional 2.5 hours.

The cooled reaction solution is rapidly decanted under nitrogen from the excess magnesium into a second 1-liter 3-necked flask equipped with a mechanical stirrer, addition funnel, dry ice condenser and nitrogen inlet. The addition funnel of this flask is charged with 48 grams of methyl iodide and the methyl iodide is then added dropwise to the solution in the flask at an addition rate to maintain a reflux temperature. Upon completion of the addition of methyl iodide, the solution is maintained at the reflux temperature for an additional 3 hours and then cooled. The cooled mixture is then slowly added to about 400 milliliters of chilled dilute 1 N hydrochloric acid. The product is extracted with 250 milliliters of diethylether and then with 375 milliliter portions of diethylether. The combined ether extracts from the aqueous phase are washed once with 75 milliliters of water and then dried over magnesium sulfate. The diethylether solvent is then evaporated under vacuum using a rotary evaporator and the flask contents are then dissolved in ethanol. The product is separated from the ethanol by crystallization by cooling the ethanol and additional crops of crystals are obtained from the mother liquor by concentrating the mother liquor and adding water to the solution until it becomes cloudy and then cooling the solution to 0° C. The total of 33 grams of product is crystallized from the ethanol liquor.

Preparation of phenylcarborane 1-phenyl-1,2-dicarbaclovododecaborane(12) is prepared from decaborane, acetonitrile and phenylacetylene following a procedure similar to that set forth in Experiment 2 for the preparation of bromomethylcarborane. The reaction flask is charged with 50 grams purified decaborane, 22 milliliters acetonitrile and 500 milliliters benzene. The solution is refluxed for two hours and thereafter the 42 grams of phenylacetylene is added dropwise and the mixture is then reflux for 30 hours. The solvent is removed under vacuum in a rotary evaporator, the residue is extracted with 1 milliliter pentane and the pentane solution is washed 4 times with 100 milliliter portions of 10 weight percent sodium hydroxide solution. The pentane solution is then dried over anhydrous magnesium sulfate and the solvent is removed with a rotary evaporator at reduced pressures to give 61.5 grams of crystalline phenylcarborane.

Phenylcarborane isomerization 1-phenyl-1,7-dicarbaclovodecaborane(12) is prepared by thermal rearrangement of the phenylcarborane prepared in the preceding experiment. This thermal rearrangement is performed in a 100 milliliter stainless steel autoclave which is charged with 5 grams of the phenylcarborane of the preceding example. The autoclave is evacuated with a mechanical vacuum pump and then heated electrically to a temperature of 420° C. for 24 hours. After cooling, the contents of the autoclave are dissolved in 30 milliliters of pentane and analyzed by thin layer chromatography to obtain 3.4 grams of the 1-phenyl-1,7-dicarbaclovodecarborane and 1.5 grams of the unconverted 1-phenyl, 1,2-carborane.

Preparation of C-ammonylmonocarborane

An ammonium monocarborane is prepared by the reaction of decaborane(14) with an isocyanide. The decaborane is charged to the reaction flask in benzene and ethyl isocyanide is added at room temperature. After one hour at room temperature, the flask contents are filtered, the separated solid is dried and dissolved in hot water. The aqueous extract is then cooled to yield about 70 percent of an ammonium monocarborate, $C_2H_5NH_2CB_{10}H_{12}$.

In another preparation, decarborane(14) is reacted with sodium cyanide by the addition of 0.28 gram of decaborane to a solution of 0.35 gram sodium cyanide in 200 milliliters water. The solution is stirred for 5 hours at 25° C. and then passed over a hydrogen charged ion exchange solid (Amberlite IR–120). The effluent comprises an aqueous solution of C-ammonylmonocarborane.

EXAMPLE II

The following experiments describe the prearation of (3)-1,2-dicarbadodecahydroundecaborates:

Dimethyl derivatives

The 1,2-dimethyl-(3)-1,2-dicarbadodecahydroundecaborate (−); $[B_9C_2H_{10}(CH_3)_2]^{-1}$ is prepared by the treatment of dimethylcarborane with alcoholic base to abstract a boron atom from the carborane. This reaction is performed in a 500 milliliter, 3-necked flask equipped with a reflux condenser, a mechanical stirrer and a nitrogen inlet. To the flask is charged a solution of 20 grams potassium hydroxide in 300 milliliters of absolute ethyl alcohol. The solution is cooled to room temperature and then 30 grams of dimethycarborane is added and the solution is stirred for one hour at room temperature and then heated to reflux temperature and maintained at that temperature until the evolution of hydrogen has ceased. The flask contents are then cooled and an additional 100 milliliters of absolute ethyl alcohol is added and carbon dioxide is then introduced into the solution to precipitate excess potassium hydroxide as the carbonate. The precipitate is removed by filtration and washed five times with 50 milliliter portions of absolute ethyl alcohol. The combined filtrate and washings are evaporated to dryness to yield a crude potassium salt which is water soluble and which can be base-exchanged with other cations such as trimethylammonium, cesium, etc.

Other dicarbadodecahydroundecaborate derivatives

The (3) - 1,2 - dicarbadodecahydroundecaborate(−1) ion, the 1 - phenyl-(3)-1,2-dicarbadodecahydroundecaborate(−1) ion, and the (3)-1,7-dicarbadodecahydroundecaborate(−1) ion are prepared in the same manner with the exception that the 1,7-isomer is formed under higher temperature conditions than the corresponding 1,2-isomers. This is accomplished by carrying out the initial alcoholic potassium hydroxide degradation in a stirred autoclave under pressure at about 150° C.

Dicarbollide preparation

The dicarbollide ion was prepared from the preceding by treatment to abstract a proton from the face of the dicarbadodecahydroundecaborate ion described in the preceding experiment. The first preparation uses an alkali metal in a solvent while the second method (Example IV) utilizes highly concentrated aqueous alkali metal hydroxide.

Anhydrous dicarbollide preparation

In this preapration a 500 milliliter, 3-necked flask fitted with a mechanical stirrer, nitrogen inlet and reflux condenser is charged with 100 milliliters tetrahydrofuran and 6.1 grams of sodium metal dispersed in a mineral oil. The mixture is stirred and then 17.3 grams of potassium dicarbadodecahydroundecaborate is added under a stream of nitrogen. The flask is heated to reflux temperature and hydrogen is rapidly evolved. The solution is maintained at reflux temperature for 20 hours and then cooled and the excess sodium is removed. The precipitate in the cooled flask is then recovered by filtration and this comprises the disodium-(1)-2,3-dicarbollide($Na_2B_9C_2H_{11}$). This material can be purified by extraction in a Soxhlet apparatus with 500 milliliters of sodium dried benzene while maintained under a nitrogen atmosphere for 48 hours. The unextracted residue comprises 3.2 grams and is recovered and dried.

Alternative anhydrous carbollide preparation

An alternate method for carbollide preparation comprises charging 1.51 grams sodium hydride in 90 milliliters tetrahydrofuran to the 500 milliliter 3-necked reaction flask and adding thereto 5 grams of the trimethylammonium dicarbadodecahydroundecaborate dissolved in 75 milliliters of tetrahydrofuran. The reaction mixture is stirred at reflux temperature under nitrogen for 3 hours or until no more gas is evolved. After completion of the reaction, the stirring is ceased and excess sodium hydride is permitted to settle and the solution is decanted and is suitable for use if promptly reacted with a metal salt or metal complex to form the dicarbollyl metal complex; see Example IV.

EXAMPLE III

The following example will illustrate the preparation of carboranes having ligand substituents on face boron atoms. These carboranes can be treated in the same manner as set forth in Example II to prepare dicarbollide anions which can then be reacted as indicated in Example IV in the preparation of carbollyl metal complexes.

B-tetrahydrofuran derivatives

The B-tetrahydrofuran substituted dicarborane $$(B_8C_2H_{11}BTHF)$$

and its C-phenyl and C,C'-dimethyl derivatives are prepared by an oxidative substitution reaction. The preparation is performed in the 3-necked, two-liter flask previously described, having a mechanical stirrer, pressure equalized addition funnel and a 12-inch distillation column with a take-off head and reflux condenser. An inlet is provided to allow nitrogen to be introduced under the liquid level through a medium porosity fitted glass dispersion tube. To the flask is added (under a stream of nitrogen), 500 milliliters of benzene which has previously been dried over sodium ribbon, 20 milliliters of freshly distilled tetrahydrofuran and 8.6 grams of benzene extracted potassium dicarbadodecahydroundecaborate.

A solution of anhydrous ferric chloride in tetrahydrofuran is prepared in a 500 milliliter Erlenmeyer flask equipped with a magnetic stirrer by introducing (under a stream of nitrogen), 200 milliliters of sodium dried benzene and 40 milliliters of freshly distilled tetrahydrofuran and then adding thereto with stirring 16.2 grams of sublimed anhydrous ferric chloride.

The resultant deep red solution is transferred to the addition funnel of the two-liter flask under a stream of nitrogen. The stirred solution in the 2-liter flask is then heated to reflux temperature and the ferric chloride solution is added dropwise from the pressure equalized addition funnel over a period of one hour. As the ferric chloride solution contacts the refluxing solution in the flask, the ferric chloride is decolorized, hydrogen chloride is evolved and a solid precipitate is formed. The hydrogen chloride is removed from the mixture by sweeping nitrogen through the solution and after the ferric chloride solution has been added to the 2-liter flask, the excess tetrahydrofuran is distilled overhead through the distillation column at a reflux ratio of about 10:1. The distillation is continued until the boiling point of the overhead distillate is that of benzene (80°) and then the reaction mixture is cooled to room temperature and filtered through a Buchner funnel.

The solid precipitate on the funnel is washed with hot benzene, the filtrate and washings are combined, placed in a separatory funnel and washed with 200 milliliter portions of distilled water until the aqueous phase is neutral to pH paper. The benzene solution is then dried over anhydrous magnesium sulfate and evaporated under vacuum to approximately 200 milliliters volume using a rotary evaporator. During the evaporation the flask contents are warmed to about 50° C. with a water bath. Approximately 100 milliliters of heptane are then added to the flask contents and the resultant solution is chilled in a methanol ice bath to recover a product by crystallization comprising 6.1 grams. Further concentration and crystallization of the mother liquor yields an additional 4 grams of product. The product is a mixture of *symmetrical* and *asymmetrical* $B_9C_2H_{11}THF$.

B-pyridine derivatives

The procedure is repeated, substituting pyridine for tetrahydrofuran previously employed, and reacting 10 grams of $(CH_3)_3NHB_9C_2H_{12}$ to obtain 10.8 grams of $B_9C_2H_{11}PY$. Using the same procedure substituting pyridine for the tetrahydrofuran and 15 grams of $$CsB_9C_2H_{10}(CH_3)_2$$

yields 11.9 grams of $B_9C_2H_9(CH_3)_2PY$.

The C-phenyl derivative is prepared by the reaction of 13 grams of $(CH_3)_3NHB_9C_2H_{11}(C_6H_5)$ with pyridine in the presence of ferric chloride. Following the procedures set forth above, 13.8 grams of $B_9C_2H_{10}(C_6H_5)PY$ is obtained.

B-acetonitrile derivatives

The substitution of acetonitrile for the tetrahydrofuran in the general procedure described in Experiment above results in the preparation of a boron-substituted acetonitrile derivative. Excess acetonitrile from the reaction is distilled from the reaction mixture as a 34 percent acetonitrile benzene azeotrope which boils at 73° C. The reaction is performed by charging 13 grams of the cesium salt of the dicarbadodecahydroundecaborate to the reaction flask and reacting it with acetonitrile in the presence of ferric chloride to produce 8.4 grams of acetonitrile derivative, $B_9C_2H_{11}CH_3CN$.

The procedure is repeated charging 15 grams of the cesium salt of the 1,2-dimethyl,1,2-dicarbadodecahydroundecaborate to the reaction flask and reacting this material with acetonitrile in the presence of ferric chloride to produce 10.1 grams of the acetonitrile dimethyl derivative having the following formula:

$$B_9C_2H_9(CH_3)_2CH_3CN$$

In a similar fashion, acetonitrile is reacted in the presence of ferric chloride with 12 grams of the potassium salt of C-phenyl dicarbadodecahydroundecaborate to produce 10.9 grams of the acetonitrile derivative having the following formula:

$$B_9C_2H_{10}(C_6H_5)CH_3CN$$

Diethyl sulfide derivatives

The diethyl sulfide derivative of the dimethyl dicarbadodecahydroundecaborate is prepared by charging 15 grams of cesium dicarbadodecahydroundecaborate to the reaction flask and reacting this material with diethylsulfide in the presence of ferric chloride. The excess diethylsulfide is separated from a benzene solution of the crude reaction products by chromatographic separation. This is achieved by dissolving a crude product in benzene and applying the solution to a chromatograph column one inch in diameter by four feet in length and eluting the solution with a mixture of 60 percent benzene and 40 percent pentane. The excess diethylsulfide is removed in the solvent front and discarded. The remainder of the column effluent is evaporated to dryness to yield 11.4 grams of the solid diethylsulfide derivative, $$B_9C_2H_9(CH_3)_2S(C_2H_5)_2.$$

This material comprised a mixture of the asymmetric and symmetric isomers.

Triphenylphosphine derivatives

The triphenylphosphine substituted borane and its C,C'-dimethyl derivative is prepared by charging 11 grams of the trimethylammonium salt of dicarbadodecahydroundecaborate to the reaction flask together with 500 milliliters benzene, and 26 grams of triphenylphosphine. The pressure equalized addition funnel is equipped with a 2 milliliter glass tube which extends to just above the stopcock in the addition funnel. A slurry of ferric chloride in benzene is placed in the addition funnel and maintained in a fluidized condition by bubbling a stream of nitrogen through this 2 milliliter dip tube. The remainder of the reaction is carried out according to the procedure described in the preparation of the tetrahydrofuran derivatives. After completion of the reaction the crude product is filtered, washed and dried and evaporated to dryness to give a solid residue. The residue is placed in a Soxhlet extractor and extracted with 250 milliliters of heptane for about 2 hours under nitrogen to remove excess triphenylphosphine. Upon completion of the extraction, the unextracted residue is recrystallized from a benzene-heptane mixture to give 15.2 grams of the triphenylphosphine derivative $B_9C_2H_{11}P(C_6H_5)_3$. This material is analyzed and found to comprise a mixture of the symmetric and asymmetric isomers.

The same procedure is repeated charging 15 grams of the cesium salt of the 1,2-dimethyl-1,2-dicarbadodecahydroundecaborate with 52.4 grams of triphenylphosphine in the presence of ferric chloride to give 10.2 grams of crystalline $B_9C_2H_9(CH_3)_2P(C_6H_5)_3$ which is a mixture of the symmetric and asymmetric isomers.

Ethoxy derivative

The B-alkoxy derivative is prepared by performing a ligand exchange reaction with the tetrahydrofuran ligand derivative previously prepared. This reaction is performed by charging the symmetrical isomer of $B_9C_2H_9(CH_3)_2$ tetrahydrofuran to a solution of potassium hydroxide in ethanol and heating the resulting solution for a few minutes and then diluting it with an equal volume of water. To the reaction flask is then added tetramethyl ammonium chloride and the alcohol is allowed to evaporate slowly at room temperature. As the alcohol evaporates, crystals of the trimethyl ammonium salt of the monovalent $B_9C_2H_9(CH_3)_2OCH_2CH_3$ anion precipitate. This ligand derivative is the symmetrical derivative indicating that no isomerization occurs during the ligand exchange.

EXAMPLE IV

The carbollyl metal complexes are prepared by the reaction of the carbollide anions described in Example II with metal salts or ligand metal complexes. A typical preparation comprises the addition of a tetrahydrofuran solution of the alkali metal salt of the carbollide ion to an anhydrous solution of the metal salt in tetrahydrofuran.

Iron group metal complexes

The iron (II) complex is prepared from a solution of ferrous chloride which is obtained by placing 1.5 grams of iron powder, 100 mesh, 6 grams of anhydrous sublimed ferric chloride and 150 milliliters of tetrahydrofuran in a reaction flask, and stirring the mixture until the iron powder has dissolved as ferrous chloride. The sodium salt of the dicarbollide anion is prepared simultaneously under nitrogen in a 300 milliliter, a 3-necked, round-bottom flask equipped with a condenser, addition funnel and magnetic stirring rod. To the flask is charged 1.51 grams sodium hydride in 90 milliliters tetrahydrofuran. A solution of 5 grams of the trimethylammonium salt of the monovalent dicarbadodecahydroundecarborate anion dissolved in 75 milliliters tetrahydrofuran is placed in the addition funnel and slowly added to the sodium hydride solution. The reaction mixture is stirred at reflux temperature until no more gas is evolved, approximately 3 hours. The solution is permitted to cool to room temperature and after the excess sodium hydride has settled, the tetrahydrofuran solution of the disodium dicarbollide anion is decanted into the ferrous chloride tetrahydrofuran mixture under a flow of nitrogen. The resultant mixture becomes dark red and this mixture is stirred for one hour at room temperature under nitrogen. The reaction solution is thereafter decanted into a 500 milliliter round bottom flask and the solvent is removed at ambient temperature using a rotary evaporator and mechanical pump vacuum. Prior to distillation the solution is stirred for 45 minutes in the presence of air to change the oxidation state of the iron from (II) to (III) corresponding to the following change:

$Na_2[(\pi-B_9C_2H_{11})_2Fe] \rightarrow Na[(\pi-B_9C_2H_{11})_2Fe]$

The residue in the evaporation flask is dissolved in 250 milliliters of water, filtered through diatomaceous earth, and the filtrate is placed in a separatory funnel and washed with two 150 milliliter portions of pentane. The aqueous layer is again filtered through the diatomaceous earth and the tetramethylammonium salt of the bis-π-dicarbollyl iron(III) is precipitated from the filtrate by the addition of 20 milliliters of 50 percent aqueous tetramethyl ammonium chloride. The precipitate is collected by filtration, washed three times with 30 milliliter portions of water and then placed in a 500 milliliter round bottom flask in a mixture of 200 milliliters acetone and 80 milliliters water. The solvent is evaporated using a rotary evaporator and water aspirator vacuum and the product crystallizes from the solution. The first crop of crystals yields about 3.12 grams and successive crops of crystals are obtained by further removal of the solvent. Total yield of crude product is 3.72 grams and further purification can be accomplished by repeated recrystallization from acetone-water and acetone-hexane extracts. This procedure is repeated with the 1,2-dimethyl dicarbollide anion and with the 1-phenyl dicarbollide anion to prepare the corresponding bis-dicarbollyl iron complexes.

A carbonylcarbollyl metal complex is prepared by introducing 150 milliliters of a tetrahydrofuran solution of 0.023 mole of disodium(1)-2,3-dicarbollide into a quartz glass cylinder. An equivalent quantity (3.9 grams) of dicobalt octacarbonyl is then added and the tube is flushed and blanketed with nitrogen and then irradiated with ultraviolet light for about 40 hours until gas evolution ceases. The liquid contents of the cylinder are poured into 2 liters of water and an aqueous solution of tetramethylammonium chloride is added to precipitate about 10 grams of the salt, tetramethylammonium tricarbonyldicarbollylcobaltate.

The preceding preparation is repeated with the addition of a molar excess of the dicobalt octacarbonyl (10.0 grams) to the carbollide solution. After completion of the reaction and admixture with an aqueous solution of tetramethylammonium chloride, the bis-tetramethylammonium salt of carbonyldicarbollylcobalt(III) - μ - dicarbonylcarbonyl-dicarbollylcobalt(III) is precipitated.

$[(CH_3)_4N]_2[(B_9H_9C_2H_2)CoCO(\mu-CO)_2$
$COCo(B_9H_9C_2H_2)]$

The cyclopentadienyldicarbollyl iron, cobalt and nickel complexes are prepared by the procedure described in Journal of American Chemical Society, 87, 1818 and 3987 (1965) by the addition of an anhydrous tetrahydrofuran solution of the chloride salt of the particular metal, i.e., $FeCl_2$, $CoCl_2$ or $NiCl_2$, to a solution of an equal molar mixture of cyclopentadienyl ($C_5H_5^-$) and dicarbollyl ($B_9C_2H_{11}^{-2}$) ions in tetrahydrofuran. The latter solution was prepared by dissolving equal molar quantities of cyclopentadiene and trimethylammonium dodecahydroundecaborate to tetrahydrofuran and treating the resulting solution with excess sodium borohydride.

The crude products in each preparation were extracted with benzene and the metal complex was precipitated from the benzene extract by the addition of pentane to yield the following complexes:

cyclopentadienyldicarbollyl iron(III) $C_5H_5FeB_9C_2H_{11}$
cyclopentadienyldicarbollylcobalt(III) $C_5H_5CoB_9C_2H_{11}$
cyclopentadienyldicarbollylnickel(III) $C_5H_5NiB_9C_2H_{11}$ Monocarbollide complexes of iron group metals A bis-π-(1)-2-monocarbollyl iron complex is prepared by charging ethylammonium monocarborate to a 250 milliliter round-bottom flask and adding thereto 75 milliliters of 50 percent aqueous sodium hydroxide. To the reactants is then charged a ferrous chloride aqueous solution containing 9.41 grams of ferrous chloride in 25 milliliters water. The mixture is heated to 70° C. on a steam bath while maintained under a nitrogen atmosphere. Ferrous hydroxide immediately precipitates and the reaction solution is periodically agitated for 30 minutes. Upon completion of the reaction the solution is diluted with 200 milliliters of water and filtered through a center disc filter containing a layer of diatomaceous earth. The residue in the filter funnel is washed three times with 20 milliliters of hot water and the filtrate and washings are acidified with 6 N hydrochloric acid to a pH of 4. The solution is permitted to oxidize to the ferric(III) state by the addition of a trace amount of ferric chloride hexahydrate and introduction of air into the solution. The solution is then brough to a pH of 8 with aqueous sodium hydroxide and the ferric hydroxide is removed by filtration. The aqueous solution is then mixed with 20 milliliters of 50 percent aqueous tetraethylammonium chloride to precipitate the tetramethylammonium salt of the bis-$\pi$-monocarbollyl iron (III), $(CH_3)_4N[(\pi-B_{10}CH_{11})_2Fe]$.

A nickel complex is prepared by dissolving 11 grams of C-ammonylmonocarbollide in 55 milliliters of a 16 weight percent sodium hydroxide solution. To the resultant solution is added 75 milliliters of an aqueous solution containing 22 grams of nickel chloride. The resultant solution is heated on a steam bath for about 30 minutes and then filtered. To the filtrate is added a solution of cesium chloride, the admixture is cooled and the cesium salt, dicesium bis(C - ammonylmonocarbollyl)nickelate(IV), is crystallized from the mixture. A neutral complex is obtained by dissolving this cesium salt in hot water and passing the solution through a column containing a strong acid ion exchange resin, Rexyl 101(H). The column effluent is collected and dried to obtain the bismonocarbollylnickel (IV) complex.

EXAMPLE V

Noble metal complexes

A bis(dicarbollyl)palladium complex was prepared from an acetylacetonate complex of palladium. The acetylacetonate complex was prepared by adding 3.4 grams 2,4-pentanedione and 13.2 milliliters of 10 percent sodium hydroxide to 50 milliliters water, then adding the resultant solution to a suspension of 2 grams palladium chloride in 200 milliliters water. The complex precipitated as a yellow solid and the admixed solutions were stirred at 80° C. for about 70 minutes, then cooled and filtered to remove the palladium acetylacetonate which was purified by extraction into heptane and subsequent crystallization therefrom.

To a solution of 3 grams trimethylammonium dicarbollide in tetrahydrofuran was added one gram of the palladium acetylacetonate and a deep red color formed in the solution. The solvent was evaporated under vacuum and the residue was dissolved in acetone and identified by nuclear magnetic resonance and by high resolution mass spectroscopy as the trimethylammonium bis-(3)1,2-dicarbollyl palladate complex;

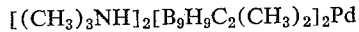

$[(CH_3)_3NH]_2[B_9H_9C_2(CH_3)_2]_2Pd$

EXAMPLE VI

The catalysts are employed for the oxidation of olefins by charging a one-half gallon titanium autoclave with 250 milliliters water, 150 milliliters benzene, 250 milliliters isopropanol, 10 milliliters concentrated hydrochloric acid, 5 grams cupric chloride and 1 gram of $\pi$-cyclopentadienyl-$\pi$-dicarbollyl iron,$[\pi - C_5H_5Fe\pi - B_9C_2H_{11}]$. Prior to use, the autoclave is flushed with a dilute aqua regia solution. The autoclave is closed, pressured to 500 p.s.i.g. with ethylene heated to 300° F. and then oxygen is slowly introduced in 10 to 20 p.s.i.g. increments while adding nitrogen when necessary to maintain a relative constant pressure. The reaction is continued for 44 minutes, then the autoclave is cooled, depressured, opened and the liquid contents weighed to reveal a 148 gram weight increase.

The products obtained are as follows:

| | Wt. percent |
|---|---|
| Acetaldehyde | 53.5 |
| Acetone | 15.5 |
| Acrolein | 6.7 |
| Acetic acid | 6.7 |
| Isopropyl acetate | 6.0 |
| Ethyl chloride | 3.0 |
| Unidentified | 7.0 |

Some of the preceding products, i.e., acetone and acrolein, are obtained by the oxidation of the isopropanol added with the catalyst. The yield of products from ethylene is:

| | Wt. percent |
|---|---|
| Acetaldehyde | 73.0 |
| Acetic acid | 13.9 |
| Ethyl chloride | 4.0 |
| Unidentified | 9.1 |

The oxidation is repeated in the absence of cupric chloride by charging to the autoclave 250 milliliters isopropanol, 250 milliliters water, 150 milliliters benzene, 10 milliliters hydrochloric acid and 1 gram of $\pi$-cyclopentadienyl - $\pi$ - dicarbollyl iron. The procedure and reaction conditions of the previous example are repeated to yield an 87 gram weight increase in 35 minutes. The yields of ethylene derived products are as follows:

| | Wt. percent |
|---|---|
| Acetaldehyde | 83 |
| Ethyl chloride | 2.9 |
| Other | 14.1 |

Some of the isopropanol is also oxidized to yield 32.6 grams acetone and 8.2 grams acrolein.

When the oxidation is repeated by charging 95 grams cyclohexene to the autoclave and pressuring the autoclave with nitrogen, rather than ethylene, oxidation of the cyclohexene to cyclohexanone occurs.

The oxidation of ethylene is repeated with the substitution of 1 gram of tetramethylammonium bis-$\pi$-(3)1,2-dicarbollyl ferrate(III); $(CH_3)_4N[(\pi-B_9C_2H_{11})_2Fe]$; for the cyclopentadienyl dicarbollyl iron complex. The procedure and reaction conditions are otherwise identical to those of the previous example and after 37 minutes the oxidation is discontinued and the reactants weighed to reveal a 14 gram weight increase. The yield of ethylene derived products is as follows:

| | Wt. percent |
|---|---|
| Acetaldehyde | 88.7 |
| Ethyl chloride | 3.8 |

In addition, 14.6 grams of acetone are formed by the oxidation of the isopropanol solvent.

The oxidation of an olefin to an unsaturated ester is performed by the oxidation of ethylene to vinyl acetate. The autoclave is charged with 500 grams acetic acid, 5 grams lithium chloride, 5 grams lithium acetate, 5 grams cupric acetate and 1 gram of $\pi$-cyclopentadienyl $\pi$-(3)1,2-dicarbollyl iron(III); $(\pi-C_6H_5)Fe(\pi-B_9C_2H_{11})$. The autoclave is closed, pressured to 500 p.s.i.g. with ethylene, heated to 300° F. and maintained at that temperature for 45 minutes while oxygen is introduced in 10–20 p.s.i. increments with the addition of nitrogen when necessary to maintain the autoclave pressure.

The autoclave is then cooled, depressured, opened and the liquid contents weighed to reveal a 69 gram weight increase. The yields of products were:

| | Grams |
|---|---|
| Acetaldehyde | 6.3 |
| Vinyl acetate | 86.5 |
| Ethyl chloride | 3.9 |
| Propionic acid | 18.0 |
| Ethylidene diacetate | 5.0 |

The oxidation of ethylene to acetaldehyde using a bis-carbollyl nickel(IV) complex is performed at atmospheric pressure in laboratory glassware. A three-necked flask is fitted with a reflux condenser, stirrer, thermometer and tubes for introduction of ethylene and air. The gases from the condenser are passed into a flask containing 2,4-dinitrophenylhydrazine. The flask is charged with water and a benzene solution of bis-(3)1,2-dicarbollyl nickel (IV) to immerse the ends of the ethylene and air introduction tubes. The flask contents are heated to reflux temperature and ethylene and air are bubbled into the solution. Acetaldehyde is produced during the experiment and is trapped as its 2,4-dinitrophenylhydrazone derivative.

When the experiment is repeated with a cobalt complex, bis-(3)1,2-dicarbollyl cobalt(IV), acetaldehyde is also produced.

The cyclopentadienyl carbollyl nickel(III) complex is used in the oxidation of ethylene to vinyl acetate. An autoclave is charged with 300 grams acetic acid and 0.07 gram cyclopentadienyl - (3)1,2 - dicarbollyl nickel(III). The autoclave is closed, pressured to 300 p.s.i.g. with ethylene and heated to 300° F. Oxygen is introduced slowly over a 15 minute reaction period and the autoclave is then cooled, depressured and the liquid contents analyzed to reveal that major products were acetaldehyde and vinyl acetate.

The oxidation of ethylene to vinyl acetate is performed by charging to an autoclave 500 grams acetic acid containing 5 grams lithium acetate dihydrate and 0.148 gram tetraphenylcyclobutadienyl - (3) - 1,2 - dicarbollyl palladium(III). The autoclave is closed, pressured with ethylene to 500 p.s.i.g. and then heated to 300° F. Oxygen and nitrogen are introduced in alternate 20 p.s.i. increments to maintain the reaction pressure over a 60 minute reaction period. The autoclave is cooled, depressured and opened and the liquid contents are analyzed to reveal a yield of 27 grams vinyl acetate.

The oxidation of ethylene to vinyl acetate and acetaldehyde is performed by charging 300 grams acetic acid containing 0.02 gram bis - (3) - 1,2 - dicarbollyl palladium(IV), 2.5 grams cupric acetate and 2.5 grams lithium chloride to an autoclave. The autoclave is pressured to 500 p.s.i.g. with ethylene and heated to 300° F. Oxygen is slowly introduced over a twenty minute reaction period in 20 p.s.i. increments. The autoclave is then cooled, depressured and opened and the liquid contents analyzed to reveal a yield of 32.8 grams acetaldehyde and 34.4 grams vinyl acetate.

When the oxidation is repeated 300 grams of caprylic acid containing 2.5 grams cupric nitrate, 4.0 grams lithium caprylate and 0.02 gram of the bis(3) - 1,2 - dicarbollyl palladium(IV) complex, similar oxidation to acetaldehyde and vinyl caprylate occurs.

When the experiment is repeated using a solution of 300 grams acetic acid containing 0.02 gram bis-(3)-1,2-dicarbollyl platinum(IV) and 7 grams concentrated nitric acid, substantially the same yields of vinyl acetate and acetaldehyde are obtained.

When the experiment is repeated with the palladium complex by charging 105 grams of propylene to the autoclave and using nitrogen rather than ethylene to pressure the autoclave, the oxidation yields propenyl acetate as the major product with a lesser amount of acetone.

The oxidation of ethylene to acetaldehyde is performed in the vapor phase. The catalyst is prepared by impregnating 25 grams of ⅛ by ⅛ inch silica pellets with 15 milliliters of an isopropanol solution containing 0.2 gram bis-(3)-1,2-dicarbollyl palladium(VI), and drying the pellets in an oven at 125° C. to remove the isopropanol.

The catalyst is charged to a U-shaped tubular reactor that is fitted with a gas inlet connected to a source of ethylene and air. The gas outlet from the reactor is passed through a water cooled trap and a Dry Ice-acetone cooled trap.

The reactor is immersed in a constant temperature bath of dichlorobenzene which is maintained at a constant temperature of 156° C. and ethylene and air are introduced while their flow rate is observed through flow meters to provide a vapor mixture of ethylene containing 25 percent air which is passed over the catalyst. Acetaldehyde is produced and collected in the product traps during several hundred hours of operation without any apparent decrease in reactivity of the catalyst.

When the oxidation is repeated with the addition of a trace amount of nitric oxide to the vapor mixture of ethylene and air, an increased rate of oxidation and acetaldehyde formation is observed.

The preceding oxidation can be repeated using high pressure equipment and pressures from 10 to about 2000 atmospheres. Oxygen can be substituted for air to provide a vapor mixture containing up to about 7 percent oxygen and the unreacted ethylene removed from the product traps can be repressured and recycled to the reactor.

The preceding exemplified disclosure is intended solely to illustrate preferred modes of practice of the invention. It is not intended that the invention be unduly limited by the disclosure, but, instead, that it be defined by the steps and reagents and their obvious equivalents set forth in the following claims.

I claim:

1. The oxidation of an olefin selected from the class consisting of hydrocarbon olefins having from 2 to about 25 carbons to prepare oxygenated compounds selected from the class consisting of:
    (a) aldehydes, ketones and carboxylic acids;
    (b) carboxylic esters of unsaturated alcohols; and
    (c) unsaturated ethers acetals and ketals;
    wherein the olefin is contacted at a temperature from 15° to about 300° C. and a pressure from 1 to about 1000 atmospheres with a carbollyl complex of a Group VIII metal with or without an organic or inorganic redox agent and a reactant selected from the class consisting of:
      (1) water and aqueous mineral acid having a pH of .1–7;
      (2) substantially anhydrous hydrocarbon carboxylic acids having from 2 to about 12 carbons and the alkali metal, ammonium and alkaline earth metal salts thereof; and
      (3) substantially anhydrous alkanols and hydrocarbon aryl alcohols having from 1 to about 12 carbons;
    to prepare aldehydes, ketones or carboxylic acids when said reactant is selected as member (1), to prepare carboxylic esters of unsaturated alcohols when said reactant is selected as member (2) and to prepare acetals and ketals when said reactant is selected as member (3).

2. The oxidation of claim 1 wherein said Group VIII metal is a noble metal.

3. The oxidation of claim 1 wherein said Group VIII metal is iron, cobalt or nickel.

4. The oxidation of claim 1 wherein said complex is a bis-carbollyl metal complex.

5. The oxidation of claim 1 wherein said complex is a carbollyl metal complex with a ligand selected from the glass consisting of carbon monoxide and cycloalkylidienes having from 4 to 8 ring carbons.

6. The oxidation of claim 1 wherein said olefin is introduced into contact with a liquid phase reaction medium containing said reactant and carbollyl catalyst at a pressure sufficient to maintain said medium in liquid phase.

7. The oxidation of claim 1 wherein an anhydrous vapor mixture of said olefin and reactant are contacted in vapor phase with said carbollyl metal complex.

8. The oxidation of claim 1 wherein said carbollyl metal complex is supported on an inert solid.

9. The oxidation of claim 1 wherein said olefin is ethylene.

10. The oxidation of claim 9 wherein said reactant is water and wherein said product is acetaldehyde or acetic acid.

11. The oxidation of claim 9 wherein said reactant is acetic acid or an alkali metal, alkaline earth metal or ammonium acetate and said product is vinyl acetate.

References Cited

UNITED STATES PATENTS

| | | | |
|---|---|---|---|
| 3,221,045 | 11/1965 | McKeon et al. | 260—497 |
| 3,303,020 | 2/1967 | Clement et al. | 260—597 |
| 3,403,108 | 9/1968 | Leftin et al. | 260—614 |

LORRAINE A. WEINBERGER, Primary Examiner

V. GARNER, Assistant Examiner

U.S. Cl. X.R.

252—431; 260—239, 247, 248, 248.5, 250, 268, 283, 290, 307, 308, 311, 313.1, 319.1, 327, 329, 436, 46.1, 46.8, 410.9, 429 439, 441, 446, 447, 453, 465.1, 469, 475, 476, 484, 485, 486, 488, 498, 533, 537, 544, 583, 586, 593, 594, 597, 602, 604, 606.5 612, 613, 614, 615, 659